US012783863B2

(12) United States Patent
Choudhury et al.

(10) Patent No.: US 12,783,863 B2
(45) Date of Patent: Nov. 3, 2026

(54) HARDWARE IMPLEMENTATION OF AN ATTENTION-BASED NEURAL NETWORK

(71) Applicant: Imagination Technologies Limited, Kings Langley (GB)

(72) Inventors: Biswarup Choudhury, Hertfordshire (GB); Cagatay Dikici, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 577 days.

(21) Appl. No.: 18/211,202

(22) Filed: Jun. 16, 2023

(65) Prior Publication Data

US 2024/0127044 A1 Apr. 18, 2024

(30) Foreign Application Priority Data

Jun. 17, 2022 (GB) ...................................... 2208958
Jun. 17, 2022 (GB) ...................................... 2208959

(51) Int. Cl.
*G06N 3/063* (2023.01)
*G06N 3/045* (2023.01)
(Continued)

(52) U.S. Cl.
CPC ............. *G06N 3/063* (2013.01); *G06N 3/045* (2023.01); *G06N 3/08* (2013.01); *G06N 5/04* (2013.01)

(58) Field of Classification Search
CPC .......... G06N 3/08; G06N 3/045; G06N 3/063; G06N 3/0455; G06N 3/0495; G06N 5/04
See application file for complete search history.

(56) References Cited

U.S. PATENT DOCUMENTS

2018/0373992 A1 12/2018 Yin et al.
2019/0197656 A1* 6/2019 Yoda ......................... G06T 1/20
(Continued)

FOREIGN PATENT DOCUMENTS

GB 2596606 A 1/2022
GB 2596607 A 1/2022
WO 2022/137696 A1 6/2022

OTHER PUBLICATIONS

Barkan, Oren et al: "Grad-SAM: Explaining Transformers via Gradient Self-Attention Maps", 2021 (Year: 2021).
(Continued)

*Primary Examiner* — Peet Dhillon
(74) *Attorney, Agent, or Firm* — Potomac Law Group, PLLC; Vincent M DeLuca

(57) ABSTRACT

A computer-implemented method for selecting numerical formats suitable for use in configuring a hardware implementation of an attention-based neural network. A dataset of test input sequences for the neural network is obtained. Each test input sequence is padded with padding values. For each padded input sequence, a padding mask is generated identifying the part of the padded input sequence that contains the padding values. An attention mask is generated from each padding mask, using an outer product operation. The padded input sequences and attention masks are processed through the neural network. During the processing, statistics are collected, describing ranges of values obtained at various layers of the neural network. Numerical formats are selected for the various layers based on the collected statistics.

20 Claims, 26 Drawing Sheets

(51) Int. Cl.
*G06N 3/08* (2023.01)
*G06N 5/04* (2023.01)

(56) References Cited

U.S. PATENT DOCUMENTS

| | | | | |
|---|---|---|---|---|
| 2019/0325314 | A1* | 10/2019 | Bourges-Sevenier | G06N 3/08 |
| 2020/0097823 | A1 | 3/2020 | Chen et al. | |
| 2021/0141798 | A1* | 5/2021 | Steedman Henderson | G06N 3/045 |
| 2021/0279569 | A1 | 9/2021 | Kim | |
| 2022/0357945 | A1* | 11/2022 | Kaul | G06F 7/483 |
| 2023/0050882 | A1* | 2/2023 | Shalai | G06F 16/9574 |
| 2023/0195833 | A1 | 6/2023 | Xi et al. | |
| 2023/0376663 | A1 | 11/2023 | Xi | |

OTHER PUBLICATIONS

Chen, Yiran et al: “A Survey of Accelerator Architectures for Deep Neural Networks”, Mar. 2020 (Year: 2020).
Guo, Kaiyuan et al: “A Survey of FPGA-Based Neural Network Inference Accelerator”, 2018 (Year: 2018).
Vaswani, et al, “Attention is all you need”, 2017 (Year: 2017).
Wikipedia: “Row and col. Major Order”, May 2022 (Year: 2022).

* cited by examiner

HARDWARE IMPLEMENTATION OF AN ATTENTION-BASED NEURAL NETWORK

CROSS-REFERENCE TO RELATED APPLICATIONS AND CLAIM OF PRIORITY

This application claims foreign priority under 35 U.S.C. 119 from United Kingdom Patent Application Nos. 2208959.3 and 2208958.5 both filed on 17 Jun. 2022, which are incorporated by reference herein in their entirety.

BACKGROUND

"Attention" refers to a technique or structural configuration that allows a neural network to focus on a certain part (or certain parts) of its input. Attention can be used to characterise relationships between different parts of different data. Applications of attention include, but are not limited to, natural language processing (NLP) and computer vision. In NLP, for example, attention mechanisms may enable a neural network model to attend to certain words in a sentence. In computer vision, attention may enable the neural network to attend to certain portions of a scene, for example.

Attention mechanisms can be categorised into two broad groups:

- "Self-attention" manages and quantifies the interdependence among a set of input elements themselves.
- "Cross attention" (also known as general attention) manages and quantifies the interdependence between two sets of input elements.

These different types of attention are used differently by different neural network architectures. In NLP, for instance, self-attention can be used by itself to understand the context of a sentence. It is applied in this way in Google's bidirectional encoder representations from transformers (BERT) technology.

In applications such as machine translation, self-attention and cross attention may be applied together, to allow the network to focus on different parts of an input sentence in an input language, and to establish relationships between parts of the input sentence and the target sentence in the target language.

Transformer networks are currently a leading example of attention-based networks. The transformer architecture was introduced in Vaswani et al. ("Attention is all you need", in Advances in Neural Information Processing Systems 30 (NIPS) 2017, https://arxiv.org/abs/1706.03762). The transformer model architecture was proposed as an alternative to the use of recurrence for sequence modelling. The original architecture was based around an encoder stack and a decoder stack, each of which is composed of multiple layers. However, more generally, transformer networks can be built around various configurations of encoder stack and/or decoder stack, such as:

- Single encoder stack, multiple decoder stacks—see Vaswani et al.;
- Single encoder stack, single decoder stack—for example, the object detection transformer (DETR) network;
- Single encoder stack—examples including BERT, vision transformer, and word language model;
- Multiple decoder stacks—for example, the generative pre-trained transformer (GPT) 1/2/3 family of models.

Transformer networks have proven to offer a powerful attention-based architecture, with state-of-the-art accuracy, across multiple modalities and tasks. These include, for 2-D images: image classification, object detection, action recognition, segmentation, super-resolution, enhancement, and colorization; for video: activity recognition and video forecasting (a type of time series forecasting); for 3D representations, such as meshes or point clouds: classification and segmentation; for text: language modelling and generation, next sentence prediction, classification, and question-answering; for audio: speech recognition and voice synthesis. There are also multi-modal applications, where inputs and outputs come from different modalities. Examples in this area include visual-question answering, reasoning, and image captioning.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

It would be desirable to be able to implement an attention-based neural network efficiently in hardware.

The invention is defined by the claims.

A computer-implemented method for selecting numerical formats is disclosed. The numerical formats are suitable for use in configuring a hardware implementation of an attention-based neural network. A dataset of test input sequences for the neural network is obtained. Each test input sequence is padded with padding values. For each padded input sequence, a padding mask is generated identifying the part of the padded input sequence that contains the padding values. An attention mask is generated from each padding mask, using an outer product operation. The padded input sequences and attention masks are processed through the neural network. During the processing, statistics are collected, describing ranges of values obtained at various layers of the neural network. Numerical formats are selected for the various layers based on the collected statistics.

According to one aspect, there is provided a computer-implemented method for selecting numerical formats for use in configuring a hardware implementation of an attention-based neural network, the method comprising: obtaining a representation of the attention-based neural network; implementing the representation as a test neural network; obtaining a dataset of first test input sequences for the attention-based neural network, wherein the dataset includes first test input sequences of varying length; padding each first test input sequence with padding values to produce a respective first padded input sequence of a first fixed length; generating, for each first padded input sequence, a respective first padding mask identifying the part of the first padded input sequence that contains the padding values; generating a first attention mask from each first padding mask, wherein the generating comprises an outer product operation applied to the first padding mask; processing the first padded input sequences and the first attention masks through the test neural network; collecting statistics describing ranges of values obtained during said processing, wherein the statistics describe ranges of values for at least two different layers of the attention-based neural network; and selecting numerical formats for the at least two different layers based on the collected statistics.

The numerical format may be a block-configurable numerical format defined by one or more configurable parameters.

The selection of the numerical format may identify a block-configurable number format of a predefined type of block-configurable number format.

The selection of numerical formats may comprise:

independently identifying, for each of the different layers, a numerical format for each instance;

combining the numerical formats for the plurality of instances so as to derive the common numerical format for the plurality of instances.

The selection of the numerical format may identify a block-configurable numerical format defined by one or more configurable parameters for each instance.

The numerical format selection may be one or more of backpropagation format selection, greedy line search and end-to-end format selection, orthogonal search format selection, maximal range (or "MinMax") format selection, outlier rejection format selection, error-based heuristic format selection (e.g. based on a sum of squared errors with or without outlier weighting), weighted outlier format selection, and a gradient weighting format selection algorithm.

Based on their different collected statistics, the numerical format selected for one of the two layers may be different from the numerical format selected for the other layer.

The method comprises, in particular, selecting numerical formats for one or both of: the first padded input sequences; and the first attention masks.

The method may comprise selecting the first fixed length. The first fixed length may be selected to be equal to the maximum length among the first test input sequences in the dataset.

The first attention masks are used in the processing to ignore certain elements of the respective first padded input sequences, in an attention-calculation. In particular, the first attention mask is used to ignore the portion of the first padded input sequence containing the padding values. The first attention mask may also be used to ignore other portions of the first padded input sequence. The first attention mask may be a self-attention mask. Generating the first attention mask may comprise an outer product of the first padding mask with itself.

The attention-based neural network may comprise a decoder, wherein the first test input sequences are test input sequences for the decoder, wherein processing each of the first padded input sequences and respective first attention masks through the test neural network optionally comprises executing the decoder for a number of iterations equal to the first fixed length, wherein the statistics are collected over all of the iterations.

If the attention-based neural network comprises only a decoder (that is, it comprises no encoder), the first attention mask is a self-attention mask. The decoder may comprise a stack of a plurality of layers.

At each iteration, the decoder may produce an output sequence, and, at each iteration other than an initial iteration, the input to the decoder comprises the output sequence from the preceding iteration. In some examples, the iterations of the decoder may be terminated early—for instance, by the decoder outputting or receiving a terminate marker. Alternatively, in some other examples, the decoder may be executed just once for a given input sequence.

The attention based neural network may comprise an encoder, and the first test input sequences may be test input sequences for the encoder. The encoder may comprise a stack of a plurality of layers.

The attention-based neural network may further comprise a decoder, and the method may further comprise: obtaining a dataset of second test input sequences, wherein the second test input sequences are test input sequences for the decoder; padding each second test input sequence with padding values to produce a respective second padded input sequence of a second fixed length; generating, for each second padded input sequence, a respective second padding mask identifying the part of the second padded input sequence that contains the padding values; and generating a second attention mask from each second padding mask, wherein the generating comprises an outer product operation applied to the second padding mask, wherein the method further comprises selecting a numerical format for at least one layer of the decoder.

The second test input sequences may be of variable length, less than or equal to the second fixed length. The first fixed length may be different from the second fixed length. The method may comprise selecting the second fixed length. The second fixed length may be selected to be equal to the maximum length among the second test input sequences in the dataset.

The method may further comprise executing the decoder for a number of iterations equal to the second fixed length, wherein, at each iteration the decoder produces an output sequence, and, at each iteration other than an initial iteration, the input to the decoder comprises the output sequence from the preceding iteration, wherein the statistics are collected over all of the iterations.

The method may further comprise generating a cross-attention mask from each first padding mask and respective second padding mask, comprising an outer product of the first padding mask with the second padding mask, wherein the method comprises: processing the first padded input sequences, the second padded input sequences, the first attention masks, the second attention masks, and the cross-attention masks through the test neural network, and selecting numerical formats for any one or any combination of two or more of: the first padded input sequences, the second padded input sequences, the first attention masks, the second attention masks, and the cross-attention masks.

The cross-attention mask is used in the processing to ignore certain elements of the output of the encoder with respect to certain elements of the second padded input sequence (that is, certain elements of the input sequence to the decoder).

The attention-based neural network may comprise a scaled dot-product attention calculation. The scaled dot-product attention calculation may comprise two matrix multiplications and a Softmax function. This may be the case, in particular, if there is a single input batch and a single-head attention layer. In the case of a multi-head attention layer (and/or if there are multiple input batches), the scaled dot-product attention calculation may comprise two batch matrix multiplications and a Softmax function. In some examples, in the case of a multi-head attention layer and multiple batches, the scaled dot-product attention calculation may comprise two batch matrix multiplications and a Softmax function for each head of the multi-head attention layer. The scaled dot-product attention calculation may further comprise one or more linear projections of its inputs. The one or more linear projections may be the first step of the calculation.

The padding values in the (or each) padded input sequence may be equal to zero.

Each padding mask may consist of ones and zeros. In particular, locations corresponding to elements of the respective input sequence may be equal to one, and locations corresponding to padding may be equal to zero.

Optionally, each first attention mask comprises: a plurality of zeros, in locations corresponding to the elements of the respective first input sequence; and one or more large negative values, in locations corresponding to the padding values of the respective first padded input sequence.

Each second attention mask may similarly comprise or consist of zeros in locations corresponding to the elements of the respective second input sequence; and large negative values in locations corresponding to the padding values of the respective second padded input sequence. Each cross-attention mask may comprise or consist of zeros in locations corresponding to the elements of the respective first and second input sequences; and large negative values in locations corresponding to the padding values of either respective padded input sequence.

The large negative values may be equal to the largest negative value representable by a numerical format selected for the first attention mask. In some embodiments, the large negative values need not be equal to said largest negative value; however, they may have values that are more negative than the largest negative value present in a data tensor input to any layer in which the first attention mask is used (for every first test input sequence). They may be more negative by a margin. That is, there may be several (unused) values between the largest negative value present in the data tensor and said large negative values. In some examples, the large negative values may have an absolute value that is greater than the largest absolute value of the data tensor. They may be greater by a margin—that is, there may be several (unused) values between the largest absolute value of the data tensor and the absolute value of the large negative values. The large negative values, x, may be chosen such that e^x=0, in the numerical format selected for the attention mask (where "e" is Euler's number). All of this applies equally to the self-attention masks and the cross-attention mask.

The attention-based neural network may comprise a Softmax function, and the processing may comprise adding the first attention mask to an input to the Softmax function. Large negative values in the padding mask may have the effect that the corresponding values of the input to the Softmax function are neglected. The large negative value added to the input dominates the previously existing value of the input. The Softmax function may be part of a scaled dot-product attention calculation, for example (as mentioned already above).

The attention-based neural network may comprise (or may be) a transformer network. The transformer network may comprise or consist of an encoder, or a decoder, or both an encoder and a decoder.

The transformer network may comprise any one or any combination of two or more of: an input embedding applied to the first padded input sequence; a first positional encoding added to the input embedding; an output embedding applied to the second padded input sequence; a second positional encoding added to the output embedding.

The transformer network may comprise one or more classification or prediction layers, coupled to an output of the decoder.

The attention-based neural network optionally comprises a layer normalisation. The layer normalisation may be applied at the output of the scaled dot-product attention calculation, for example. The layer normalisation may alternatively or additionally be applied at the output of a feed-forward layer in either the encoder or the decoder.

The hardware implementation may be configured to perform a set of available elementary neural network operations, the method optionally comprising: mapping the layer normalisation to an equivalent representation comprising a plurality of elementary neural network operations from the set of available elementary neural network operations; and selecting numerical formats for said plurality of elementary neural network operations, wherein each of the plurality of elementary neural network operations is selected from the list consisting of: a convolution operation; an element-wise subtraction operation; an element-wise multiplication operation; a reciprocal operation; a square root operation; an element-wise division operation; a rectified linear activation function; a local response normalisation; an element-wise addition.

The element-wise operations may be implemented by an element-wise operations unit of the NNA. The rectified linear activation function may be implemented by an activation unit of the NNA. The local response normalisation, reciprocal operation, and square root operation may be implemented by a local response normalisation unit of the NNA. (It should be understood that the parameters input to the LRN unit may be selected to configure it appropriately for the desired operation to be performed.) The convolution operation may be implemented by a plurality of convolution engines of the NNA.

In some examples, the plurality of elementary neural network operations implements: a first convolution operation, applied to an input to the layer normalisation, to calculate a mean of the input; an element-wise subtraction operation, to subtract the mean from the input; a first element-wise multiplication operation, to calculate the square of the output of the element-wise subtraction operation; and a second convolution operation, applied to the output of the first element-wise multiplication operation, to calculate the variance about the mean.

The plurality of elementary neural network operations may further implement a second element-wise multiplication operation, configured to control the standard deviation of the output of the layer normalisation. It may further implement a first element-wise addition operation (optionally applied to the output of the second element-wise multiplication operation), configured to control the mean of the output of the layer normalisation.

The plurality of elementary neural network operations may further implement a square root operation, applied after the second convolution operation, to calculate a standard deviation.

The plurality of elementary neural network operations may further implement a second element-wise addition operation, configured to add a small (positive) value to the standard deviation. The addition of this small value helps ensure numerical stability, by avoiding a divide-by-zero condition. An exemplary value for the small positive value is 1e-5 (0.00001).

In some examples, the plurality of elementary neural network operations implements: a square root operation and a reciprocal operation, applied after the second convolution operation, to calculate the reciprocal of the standard deviation; and a second element-wise multiplication operation, to multiply the output of the element-wise subtraction operation by the standard deviation.

In some examples, the plurality of elementary neural network operations implements: a square root operation, applied to the output of the second convolution operation, to calculate the standard deviation; and an element-wise division operation, to divide the output of the element-wise subtraction operation by the reciprocal of the standard deviation.

In some examples, the plurality of elementary neural network operations implements: a rectified linear activation function, applied to the output of the second convolution operation; an element-wise addition operation, applied to the output of the rectified linear activation function; a local response normalisation, applied to the output of the element-wise addition operation, to calculate the reciprocal of the standard deviation; and a second element-wise multiplication operation, to multiply the output of the element-wise subtraction operation by the reciprocal of the standard deviation.

The element-wise addition operation may comprise adding a small constant value to the output of the rectified linear activation function. This may be done to avoid a divide by zero condition.

The attention-based neural network may comprise a Softmax function, wherein the hardware implementation is configured to perform a set of available elementary neural network operations, the method optionally comprising: mapping the Softmax function to a representation comprising a plurality of elementary neural network operations from the set of available elementary neural network operations; and selecting numerical formats for said plurality of elementary neural network operations, wherein each of the plurality of elementary neural network operations is selected from the list consisting of: a transpose or permute operation; a max pooling operation; an element-wise maximum operation; an element-wise subtraction operation; an element-wise negation operation; an element-wise addition operation; an element-wise division operation; an element-wise multiplication operation; an element-wise bit-shifting operation; an element-wise operation f(z)=2^z, where z is in general a non-integer value; a convolution operation; a function approximation operation; and a local response normalisation.

The attention-based neural network may comprise a matrix multiplication operation defined in two or more dimensions between a first tensor X having dimensions [ . . . , P, . . . , Q, . . . ] and a second tensor Y having dimensions [ . . . , R, . . . ], the method optionally comprising: mapping the matrix multiplication operation to a graph of neural network operations including at least one transformation and at least one convolution operation; and selecting numerical formats for the graph of neural network operations.

In some examples, the attention-based neural network may comprise a matrix multiplication operation defined in two or more dimensions between a first tensor X having dimensions [ . . . , P, . . . , Q, . . . ] and a second tensor Y having dimensions [ . . . , R, . . . ], the method optionally comprising: mapping the matrix multiplication operation to a graph of neural network operations including at least one element-wise operation; and selecting numerical formats for the graph of neural network operations.

The matrix multiplication operation may be part of an attention calculation. In particular, it may be part of a scaled dot-product attention calculation. The matrix multiplication operation may be a batch matrix multiplication operation.

Also provided is a data processing system configured to perform a method as summarised above. The data processing system may be embodied in hardware on an integrated circuit.

Also provided is a method of manufacturing, using an integrated circuit manufacturing system, a data processing system as summarised above.

Also provided is a method of manufacturing, using an integrated circuit manufacturing system, a data processing system as summarised above, the method comprising: processing, using a layout processing system, a computer readable description of the data processing system so as to generate a circuit layout description of an integrated circuit embodying the data processing system; and manufacturing, using an integrated circuit generation system, the data processing system according to the circuit layout description.

Also provided is computer readable code configured to cause a method as summarised above to be performed when the code is run. Also provided is a computer readable storage medium (optionally non-transitory) having encoded thereon the computer readable code.

Further provided is an integrated circuit definition dataset that, when processed in an integrated circuit manufacturing system, configures the integrated circuit manufacturing system to manufacture a data processing system as summarised above.

Also provided is a computer readable storage medium having stored thereon a computer readable description of a data processing system as summarised above that, when processed in an integrated circuit manufacturing system, causes the integrated circuit manufacturing system to manufacture an integrated circuit embodying the data processing system.

Also provided is a computer readable storage medium having stored thereon a computer readable description of a data processing system as summarised above which, when processed in an integrated circuit manufacturing system, causes the integrated circuit manufacturing system to: process, using a layout processing system, the computer readable description of the data processing system so as to generate a circuit layout description of an integrated circuit embodying the data processing system; and manufacture, using an integrated circuit generation system, the data processing system according to the circuit layout description.

Also provided is an integrated circuit manufacturing system configured to manufacture a data processing system as summarised above.

Further provided is an integrated circuit manufacturing system comprising: computer readable storage medium having stored thereon a computer readable description of a data processing system as summarised above; layout processing system configured to process the computer readable description so as to generate a circuit layout description of an integrated circuit embodying the data processing system; and an integrated circuit generation system configured to manufacture the data processing system according to the circuit layout description. The layout processing system may be configured to determine positional information for logical components of a circuit derived from the integrated circuit description so as to generate a circuit layout description of an integrated circuit embodying the data processing system.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1A:
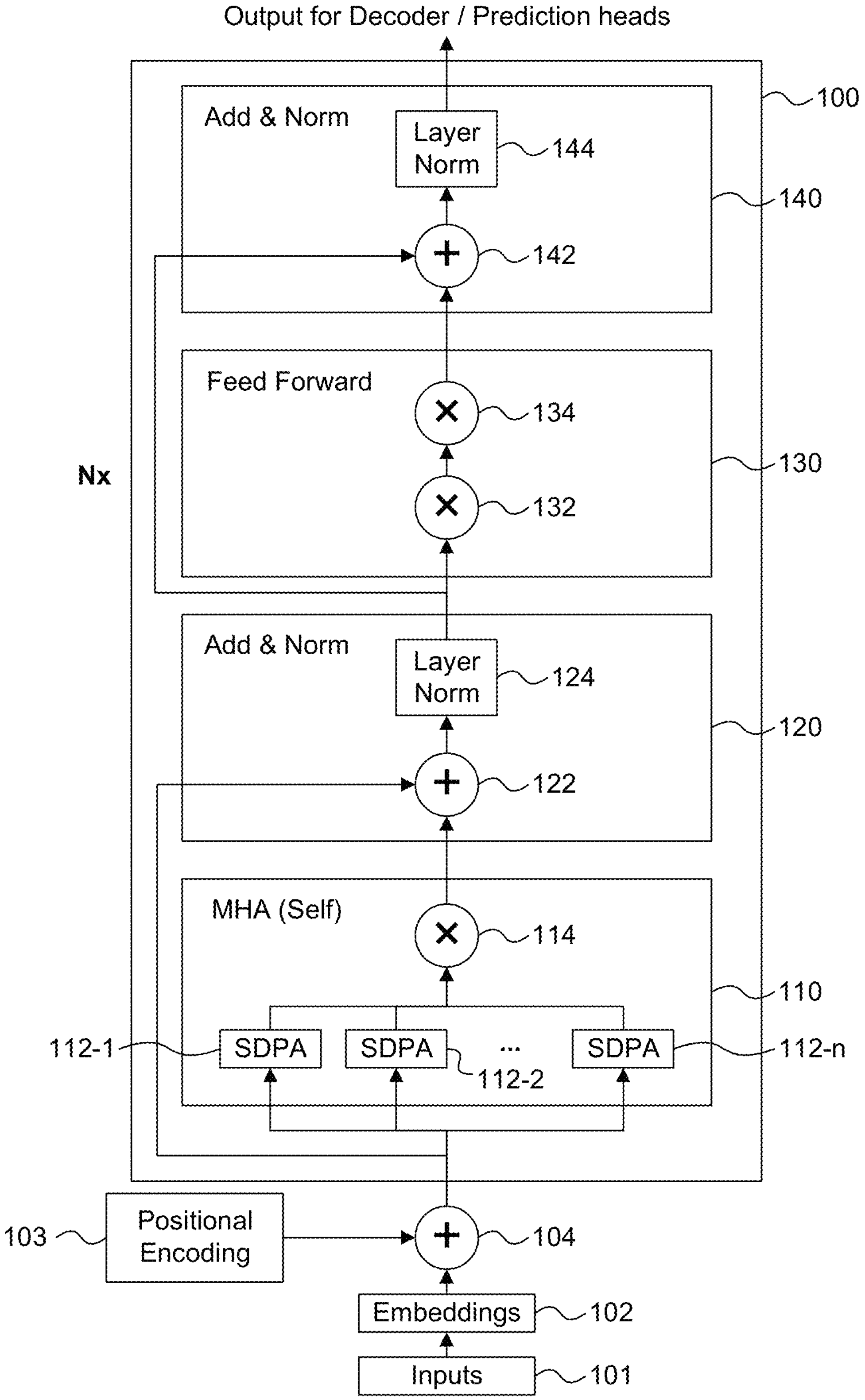
FIG. 1A illustrates an implementation of one layer of an encoder stack for a transformer network, according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

In the following description, transformer networks will be used as an example of an attention-based neural network. This is a convenient and useful example, since such networks have been found to produce good performance in many tasks. Nevertheless, it should be understood that the scope of the present disclosure is not limited to transformer networks. The present disclosure is equally applicable to other attention-based networks. For understanding the transformer network examples in the following description, it is assumed that the reader will already be familiar with the paper of Vaswani et al., cited above.

FIG. 1A illustrates an implementation of one layer 100 of an encoder stack in a transformer network. There may be many such layers in the encoder stack, as indicated by the "Nx" annotation in the drawing. The number N of layers is at least one, but will be greater than one in many examples. The general structure of the encoder will be familiar from Vaswani et al. The inputs to the encoder stack comprise sequences of "tokens" or "elements". Before passing them to the first layer of the encoder, the inputs 101 are "embedded" by means of a linear projection 102. A positional encoding 103 is added to the result of the embedding, at adder 104. The positional encoding 103 injects information about the position of the tokens in the sequence. Like Vaswani et al, the present example uses periodic functions of different frequencies for the positional encoding. It should be understood that the embedding and positional encoding is necessary only at the input to the first layer of the encoder stack. Subsequent layers in the stack (not shown) will take their inputs directly from the outputs of the preceding layers.

The layer 100 of the encoder stack comprises: a multi-head attention block 110; an add and normalise block 120; a feedforward block 130; and a further add and normalise block 140. The multi-head attention block 110 executes self-attention on the inputs. In the present example, this is done by a plurality of scaled dot-product attention (SDPA) blocks 112-1 to **112-*n*, where n is the number of heads. However, it should be understood that other forms of attention calculation could be used in place of the SDPA. The outputs of the multiple heads are concatenated and subjected to a linear projection 114**.

The output of the multi-head attention block 110 is provided as input to the add and normalise block 120. This block 120 comprises an adder 122, configured to add the output of the multi-head attention block 110 to the input to that block. Layer normalisation 124 is applied to the result of the addition 122.

The output of the add and normalise block 120 is provided as input to the feedforward block 130. This block comprises one or more feedforward neural network layers. In the present example, there are two feedforward layers 132 and 134.

The output of the feedforward block 130 is provided as input to the further add and normalise block 140. This has a similar structure to the add and normalise block 120. An adder 142 is configured to add the output of the feedforward block 132 to the input to that block. A layer normalisation 144 is applied to the output of the addition 142. The output of the further add and normalise block 140 forms the output of this layer of the encoder stack. If the current layer is not the final layer of the encoder stack, the output of the add and normalise block 140 is input to the next layer of the encoder stack. If the current layer is the final layer of the encoder stack, then the output of the add and normalise block 140 forms the output of the encoder. This output may be provided to one or more prediction heads, or to a decoder stack, depending on the particular application of the transformer network. That is, the encoder stack may be used alone or in conjunction with a decoder stack (such as the decoder stack described below with reference to FIG. 1B).

Figure 1B:
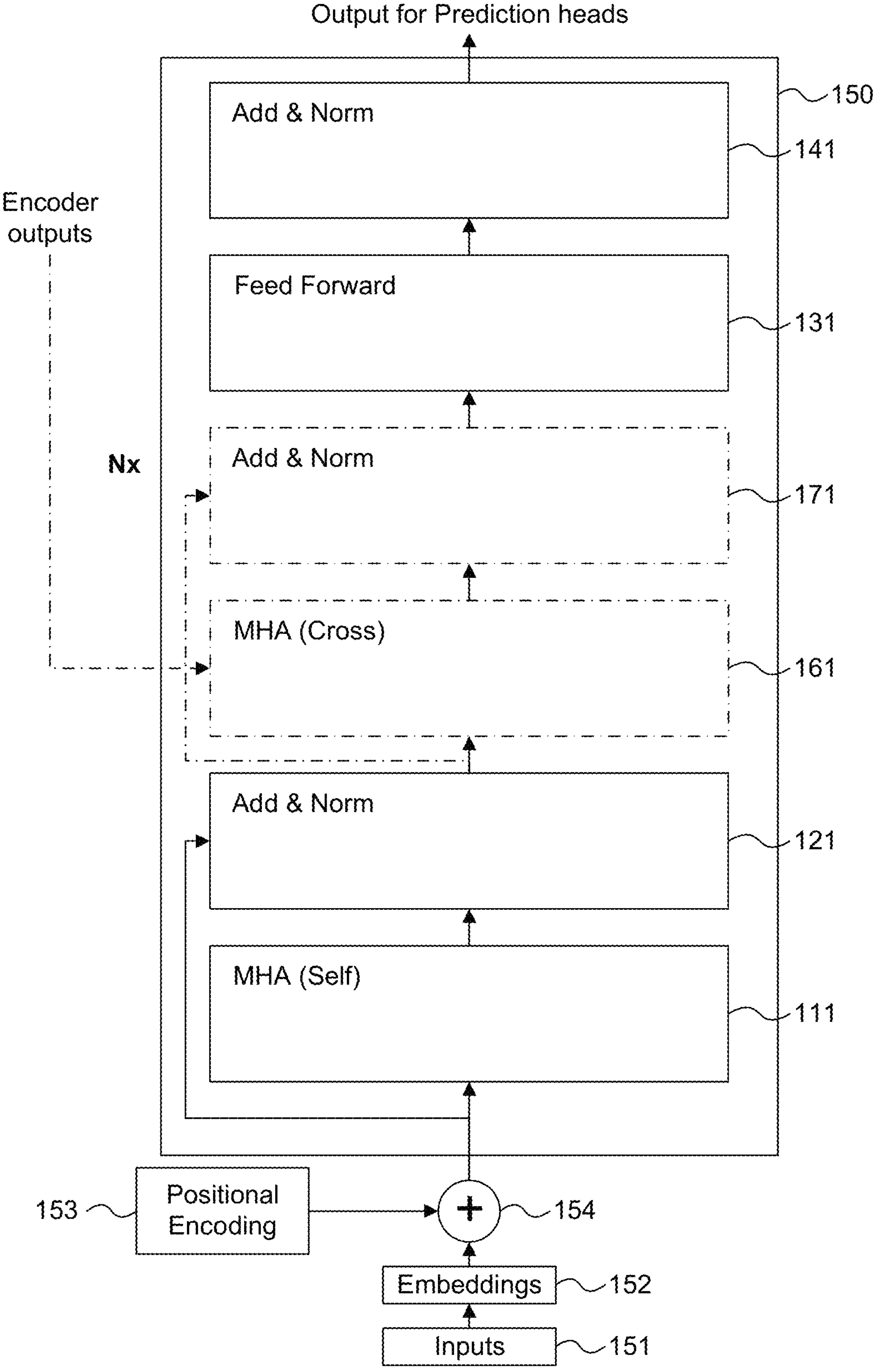
FIG. 1B illustrates an implementation of one layer of a decoder stack for a transformer network, according to an example.

FIG. 1B illustrates an implementation of one layer 150 of a decoder stack of a transformer network. Depending on the particular application of the transformer network, the decoder stack may be used alone, or in conjunction with an encoder stack (such as the encoder stack described above with reference to FIG. 1A). As with the encoder stack, the decoder stack in general includes a number of layers, N, where N is greater than or equal to 1. The layer 150 of the decoder stack illustrated in the drawing is shown as the first layer of the decoder stack. Before passing them to the layer 150, the inputs 151 are embedded, at block 152, and a positional encoding 153 is added at block 154. In this respect, blocks 152 and 154 are analogous to blocks 102 and 104. However, the particular embeddings and positional encodings are generally not identical between an encoder and decoder. The inputs are also typically different. For example, in a transformer network that is trained for language translation, the tokens may be words. In the training phase, the encoder stack takes as input a sequence of words (e.g. a sentence) in the source language. The decoder stack takes as input a sequence of words (e.g. a sentence) in the target language. The embedding (which may be learned) and the positional encoding may be different for each language.

As with the encoder layer 100, the general structure of the decoder layer 150 will be familiar from Vaswani et al. The layer 150 of the decoder stack comprises: a first multi-head attention block 111; a first add and normalise block 121; a second multi-head attention block 161; a second add and normalise block 171; a feedforward block 131; and a further add and normalise block 141. The multi-head attention block 111 has the same structure as the multi-head attention block 110 of the encoder layer. It executes self-attention on the inputs using a plurality of SDPA blocks (not shown).

The output of the multi-head attention block 111 is provided as input to the first add and normalise block 121. This is similar in structure and function to the add and normalise block 120 of the encoder layer. When the decoder stack is used together with the encoder stack, the output of the add and normalise block 121 is provided as input to the second multi-head attention block 161. This block 161 also receives as an input the output of the encoder stack. The second multi-head attention block 161 executes cross attention between the decoder inputs and the encoder inputs. The output of the second multi-head attention block 161 is provided as input to a second add and normalise block 171. Similarly to the add and normalise blocks 120 and 121, this block adds together the inputs and outputs of the second multi-head attention block 161 and performs layer normalisation on the result of the addition. The output of the second add and normalise block 171 is provided as input to the feedforward block 131. (When the decoder stack is used alone—that is, without the encoder stack—the feedforward block 131 receives its input directly from the first add and normalise block 121.)

The feedforward block 131 is similar in structure and function to the feedforward block 130 of the encoder layer. It comprises one or more feedforward neural network layers—for example, two feedforward layers. The output of the feedforward block 131 is provided as input to a further add and normalise block 141, which is similar in structure and function to the add and normalise block 140 at the end of the encoder layer. The output of the further add and normalise block 141 forms the output of this layer of the decoder stack. If the current layer is not the final layer of the decoder stack, the output of the add and normalise block 141 is input to the next layer of the decoder stack. If the current layer is the final layer of the decoder stack, then the output of the add and normalise block 141 forms the output of the decoder. This output may be provided to one or more prediction heads.

In some applications of transformer networks, the decoder stack is executed iteratively, for a number of iterations that may be fixed or variable. For instance, using the machine translation example mentioned above, the decoder stack may be executed for several iterations, until the decoder outputs an "end" token, which indicates that the end of the sentence has been reached in the target language, and terminates the iterations. At each iteration, one more word of the corresponding sentence in the target language would be predicted.

A problem can arise when attempting to implement attention-based networks, such as the transformer network example of FIGS. 1A and 1B, in the fixed-function hardware of a neural network accelerator (NNA). The inputs to the encoder and decoder stacks are, in general, sequences of variable length. For instance, in the machine translation example discussed above, the sequence length depends on the number of words in the sentence. In an exemplary NNA architecture, it may be inefficient or impossible to process inputs of variable length. The fixed-function hardware may require inputs of fixed length (or may be more efficient at processing such inputs).

In examples according to the present disclosure, it is proposed to pad the variable length input sequences to a fixed length. The inputs to the encoder stack are padded to a first fixed length and the inputs to the decoder stack are padded to a second fixed length. These fixed lengths may be different, reflecting the fact that input sequences of different length may be expected at the encoder as compared with the decoder. The fixed length may be chosen based on the range of variable lengths encountered over a training dataset of input sequences. In particular, each fixed length may be chosen to be equal to the maximum length of the respective input sequences of the training dataset.

The padding of the input sequences is not explicit in FIGS. 1A and 1B. However, it should be understood that the inputs 101 and 151 in these diagrams are already padded. This means that a first portion of each input tensor is identical to the corresponding variable length input tensor. The remaining portion of each input tensor consists of padding values. In the present example, these are set equal to 0.

When padding the variable length input sequences to a fixed length, care should be taken to ensure that the padding does not unduly influence the calculations in the attention-based network. In particular, in examples according to the present disclosure, it is proposed to modify the attention calculation to accommodate the padding. Because of the form of the calculations, it is not sufficient simply to set the padding values equal to 0.

Figure 1C:
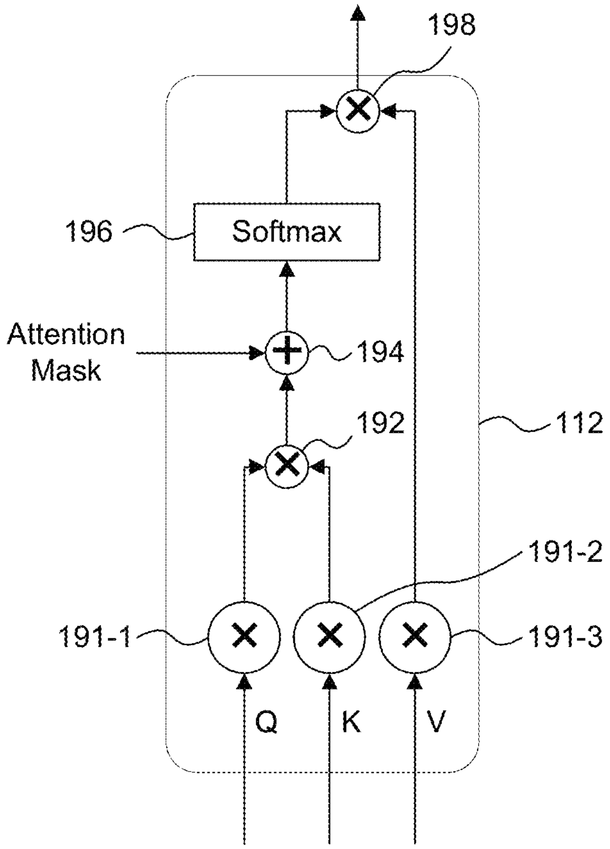
FIG. 1C illustrates an implementation of a scaled dot-product attention calculation, according to an example.

FIG. 1C illustrates an implementation of a scaled dot-product attention calculation 112, as used and shown in FIG. 1A, and as used (but not shown) in FIG. 1B. Block 112 shows a single SDPA calculation. It should be understood that this is performed for each head in a multi-head attention calculation. The inputs to the SDPA calculation are labelled Q, K, and V. The tensor Q is known as the “query”; the tensor K is known as the “keys”; and the tensor V is known as the “values”. Optionally, each of these may first be subjected to a respective linear projection 191-1, 191-2, and 191-3, as described by Vaswani et al. Then, the (projected) tensor Q and the (projected) tensor K are input to a matrix multiplication 192. (In general, if there are multiple batches of input data, this may be a batch matrix multiplication.)

The output of the (batch) matrix multiplication 192 provides one input to an addition operation 194. The other input to the addition 194 is an attention mask defined for the input sequence. The dimensions of the attention mask (like those of the tensors Q, K, and V) are determined by the fixed lengths. According to the present example, the attention mask contains values of zero in positions corresponding to the original variable-length input sequence. In positions corresponding to the padding (in the padded input sequence), the attention mask contains large negative values. The intention is that the output of the addition 194 should be dominated by these large negative values in the positions corresponding to the padding.

By way of example: for tensors Q and K with dimensions $(N, L_1, D)$, the attention mask for the self-attention block 110 has dimensions $(N, L_1, L_1)$, where $L_1$ is the fixed length chosen for the encoder stack. The attention mask for the self-attention block 111 has dimensions $(N, L_2, L_2)$, where $L_2$ is the fixed length chosen for the decoder stack. The attention mask for the cross-attention block 161 has dimensions $(N, L_1, L_2)$.

In the case of the self-attention block 110, the inputs V, K, and Q are the inputs to the encoder. Likewise, in the case of the self-attention block 111, the inputs V, K, and Q are the inputs to the decoder. In the case of the cross-attention block 161, the tensors V and K come from the output of the encoder, while the tensor Q is an input to the decoder.

The attention masks are calculated from padding masks, which are associated with the respective padded input sequences. Each padding mask has the same fixed length as the associated padded input sequence. The portion of the padding mask corresponding to the original, variable-length input sequence contains values equal to one. The remainder of the padding mask, corresponding to the padding values in the padded input sequence, contains values equal to zero. A first padding mask is associated with the input to the encoder; a second padding mask is associated with the input to the decoder. To generate the self-attention mask for the self-attention block 110 of the encoder, the outer product of the first padding mask with itself is calculated. The result of the outer product calculation has ones at locations corresponding to the original, variable length encoder input sequence, and zeros at locations corresponding to the padding. To produce the self-attention mask from the result of the outer product calculation, the zeros are replaced with large negative values and the ones are replaced with zeros. Consequently, the self-attention mask contains zeros at the locations corresponding to the original, variable length encoder input sequence, and contains large negative values at the locations corresponding to the padding. The self-attention mask for the self-attention block 111 of the decoder is generated in the same way, from the second padding mask. The cross-attention mask for the cross-attention block 161 of the decoder is generated from the first padding mask and the second padding mask. Firstly, the outer product of these two masks is calculated. Then, the zeros in the outer product are replaced with large negative values, and the ones in the outer product replaced with zeros. Consequently, the cross-attention mask contains zeros at locations corresponding to a “one” in both the first padding mask and the second padding mask. It contains large negative values at locations that correspond to a zero in either padding mask—that is, locations that correspond to padding in either mask.

According to the present example, the padding values are appended to the original (variable length) input sequences. Consequently, the attention masks have a block structure, with a block of zeros whose dimensions are dependent on the size of the original variable length input sequence, and with the remainder of the elements of the tensor being equal to the large negative value.

The self-attention masks can be modified to prevent the network from attending (via self-attention or cross-attention) to certain elements of the original (variable length) input sequences. This can be done either by modifying the attention masks directly (by changing a zero to a large negative value), or by modifying the padding masks before the outer product calculations (changing a one to a zero). The elements to which the network is to be prevented from attending may be indicated by an external input to the network—for example, an additional variable provided in a function call that instantiates the neural network.

The output of the addition 194 is input to a Softmax function 196. This calculates the Softmax over the features among which attention is being computed. The Softmax function involves applying an exponential function to the input. The result of the calculation $e^x$ tends to zero when x is a large negative number. This ensures that the padded part of the input tensor does not influence the Softmax calculation. In some examples, the large negative number x may be chosen such that $e^x=0$ in the numerical format used for the relevant (self-attention or cross-attention) mask and the input to the Softmax function. In this way, the large negative number approximates $-\infty$ (minus infinity) in the calculation.

The output of the Softmax function 196 forms one input to a (batch) matrix multiplication 198. The other input to the (batch) matrix multiplication 198 is the tensor of (projected) values, V. Together the blocks 192, 194, 196, and 198 implement the following equation, with no interference from the padded part of the respective input vectors:

$$\text{Attention}(Q, K, V) = Softmax\left(\frac{QK^T}{\sqrt{d_k}}\right)V.$$

According to the present example, all of the calculations necessary to implement the attention-based network can be constructed from elementary neural network operations available on an exemplary hardware accelerator (NNA). This includes calculations that are not usually natively supported on NNAs, such as (batch) matrix multiplication, Softmax, and layer normalisation. This can be achieved without necessarily modifying the hardware of the hardware accelerator.

Exemplary Hardware Accelerator

Figure 2:
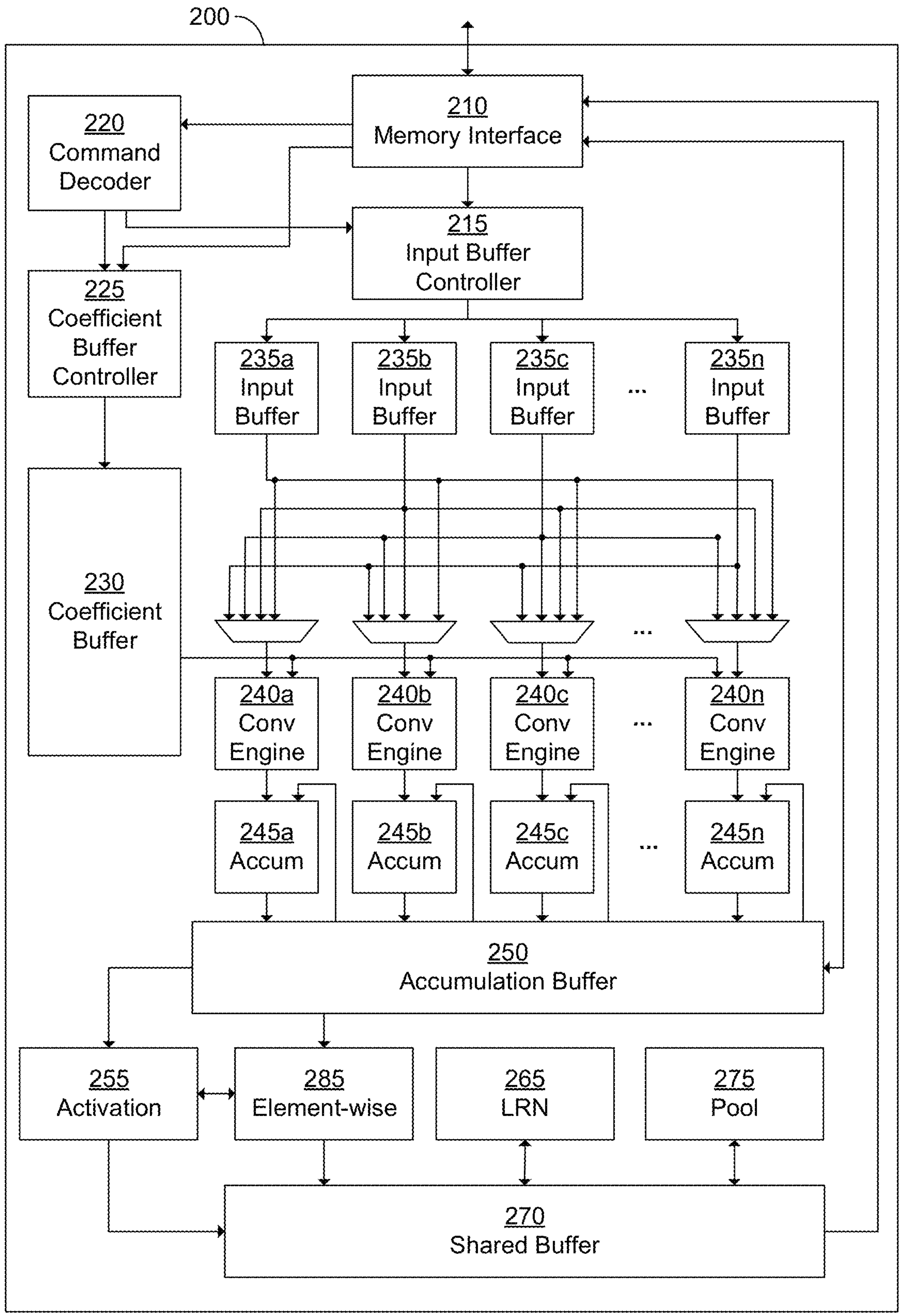
FIG. 2 is a block diagram of a hardware accelerator comprising fixed-function hardware, according to an example of the present disclosure.

As shown in FIG. 2, an exemplary hardware accelerator 200 (also referred to herein as a neural network accelerator or NNA) includes the following fixed-function hardware units:

- A set of convolution engines 240, specialised at convolution operations;
- An element-wise operations unit 285, specialised at performing the same operation to every pair of respective elements of two tensors of corresponding size;
- An activation unit 255, specialised at applying an activation function (which may be selectable, configurable, or fully programmable) to every element of a tensor;
- A local response normalisation (LRN) unit 265 (or normalisation unit, for short), specialised at performing neighbourhood-based normalisation operations; and
- A pooling unit 275, specialised at performing pooling operations, such as max-pooling and min-pooling.

In greater detail, the hardware accelerator 200 comprises digital logic circuitry that is configured to receive data (including weights and input tensors) and commands for processing them. The hardware accelerator 200 comprises a memory interface 210, an input buffer controller 215, a command decoder 220, a coefficient buffer controller 225, a coefficient buffer 230, n input buffers 235, n convolution engines 240, n accumulators 245, an accumulation buffer 250, an activation unit 255, a local response normalize (LRN) unit 265, a shared buffer 270, a pooling unit 275, and an element-wise operations unit 285. The hardware accelerator 200 can be used to evaluate elementary neural network operations.

Figure 4:
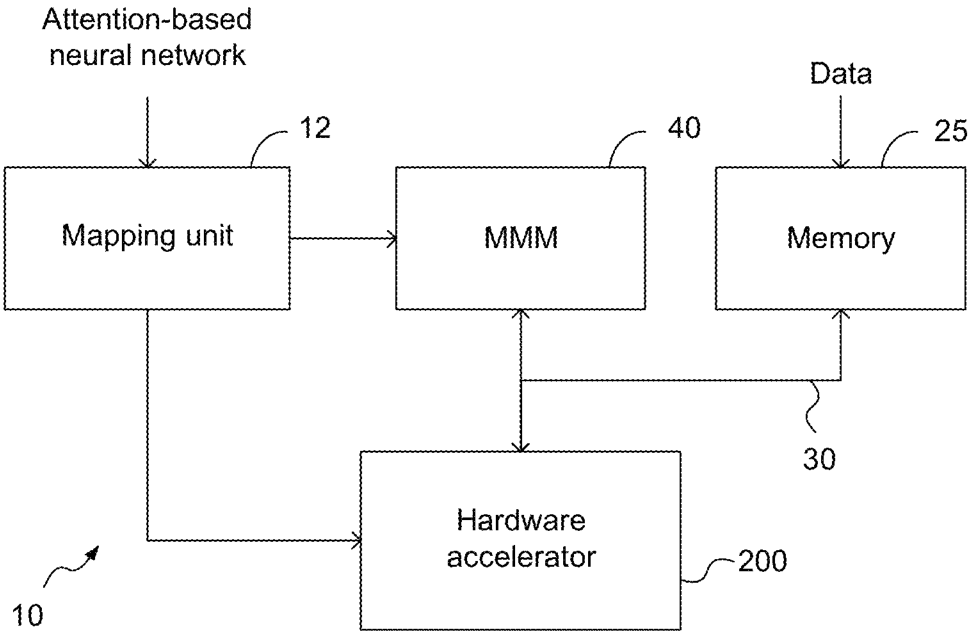
FIG. 4 is a block diagram of a data processing system according to an example.

The memory interface 210 is configured to provide an interface between the hardware accelerator 200 and external memory 25 (not shown in FIG. 2, but shown in e.g. FIG. 4). The external memory 25 may be considered as a separate module to the hardware accelerator 200. The command or configuration information may comprise, for example, information regarding weight and data size and format as well as their location in the external memory.

The memory interface 210 is configured to receive, from external memory 25, weights and data to be used in calculations within the neural network, as well as command information to control the operation of the hardware accelerator 200. The received weights (also referred to herein as coefficients) are passed to the coefficient buffer controller 225 and the received data is passed to the input buffer controller 215. The received commands are passed to the command decoder 220, which, in turn, is configured to decode the commands and subsequently issue control information to elements of the hardware accelerator, including the coefficient buffer controller 225 and input buffer controller 215 to control the manner in which the weight and input data is stored in the buffers.

The weights and input data received from external memory via memory interface 210 during a read of the external memory may form the weights and input data for only a portion of a single layer, all of the weights and input data to be used in processing a single layer, or may comprise the weights and input data for processing multiple layers.

In practice, the number of weights and data received in a single read from external memory 25 will depend upon the size of the coefficient buffer 230 and the input buffer 235. The weights are passed from the coefficient buffer controller 225 to the coefficient buffer 230 and the data received is passed from the input buffer controller 215 to a plurality of input buffers 235*a*-235*n*. The number of input buffers will depend upon the specific implementation of the accelerator 200 but may take any value. The input data is shared across all of the input buffers 235*a*-235*n*. The input buffers each form an effective bank such that the number of input buffers can be increased or decreased depending on the application.

The input buffers 235*a*-235*n* are connected to each of a plurality of multiplexers, since each convolution engine 240*a*-240*n* requires access to all of the effective 'banks' of the input data. The multiplexers are each configured to select an output from one of the input buffers 235 and to pass the values output from the selected input buffer 235 to a respective convolution engine 240*a*-240*n*. In addition, weights from the coefficient buffer 230 are provided as a second input into each convolution engine 240*a*-240*n*. The convolution engines 240 are configured to perform a convolution calculation on the received input data using the weights received from the coefficient buffer 230. The resultant output of each convolution engine 240*a*-240*n* is provided as an input to a respective accumulator of a plurality of accumulators 245*a*-245*n*.

Each accumulator 245*a*-245*n* is connected to an accumulation buffer 250. The accumulation buffer 250 is configured to store accumulated results received from each accumulator 245*a*-245*n*. The accumulation buffer 250 is connected to the memory interface 210. As such, the accumulation buffer 250 is configured to send and receive data to and from external memory 25 via memory interface 210. Specifically, the accumulation buffer 250 is configured to be able to store and restore its values from the external memory 25 via memory interface 210, as will be described in more detail below. The accumulation buffer 250 is connected to the input of the accumulators 245*a*-245*n* and is configured to feed values back into the accumulators 245*a*-245*n* to enable accumulation calculations to take place.

The accumulation buffer 250 is configured to pass accumulated values to the activation unit 255 and/or the element-wise operations unit 285. The activation unit 255 is configured to perform at least one of a number of different activation functions.

The resultant value calculated by the activation unit 255 can be passed to be processed by the LRN unit 265 and/or the pooling unit 275 via the shared buffer 270. The LRN unit 265 is configured to perform a local response normalisation. This may be performed within a single plane of input data. Alternatively or in addition, the LRN operation may also be performed across planes.

A result stored in the shared buffer 270 is passed to the memory interface 210, which can either store the result in external memory 25 or pass the result back into the input buffers for further processing without having to first be passed out to external memory.

The shared buffer 270 is configured to buffer values from any one or more of the activation unit 255, the LRN unit 265, the pooling unit 275, and the element-wise operations unit

285 until all the values required to perform the next operation are available. In this way, the shared buffer 270 is used for efficiency of storage as it can hold values required in later operations without having to use external memory 25.

The element-wise operations unit 285 comprises circuitry configured to perform element-wise operations on tensors received from the accumulation buffer 250 and/or activation unit 255. The supported element-wise operations may include element-wise addition, subtraction, multiplication, division, and maximum (or minimum) of the respective elements of the tensors.

Element-wise operations are operations that are repeated for multiple elements of at least one tensor. The operations are typically repeated for all elements of the tensor. Two categories of element-wise operation may be considered: unary operations, having a single operand, and binary operations, having two operands. The element-wise operations unit 285 handles binary element-wise operations. Element-wise operations may also be performed by other components of the hardware accelerator. For example, the activation unit 255 may perform unary element-wise operations, by applying a function to every element of a tensor.

Whilst the hardware accelerator of FIG. 2 illustrates a particular order in which the units are arranged and thus how the processing of data flows through the hardware implementation, it will be appreciated that the specific calculations required and the order in which data is processed across layers may vary.

In some examples of evaluating neural network layers, the functions performed by the activation 255, LRN 265, pooling 275, and element-wise 285 units may all be performed. In other examples, only some of these functions may be performed and not necessarily in the order set out in the hardware accelerator 200. To achieve a configurable order of processing these functions, each of the activation 255, LRN 265, pooling 275 and element-wise 285 units may be configured to receive control signalling configuring the unit into a bypass mode in which the function is not performed and the input values are simply passed through the unit without change.

Advantageously, since the activation, LRN, pooling, and element-wise units 255, 265, 275, 285 are placed linearly, it is possible to perform these operations sequentially without having to retrieve data from external memory 25. In some implementations, the order in which the activation, LRN, pooling, and element-wise units 255, 265, 275, 285 are connected may vary. For example, the activation, LRN, and pooling units 255, 265, 275 may be connected in reverse order such that the pooling unit is connected to the accumulation buffer 250 and the activation unit is connected to the memory interface 210.

Figure 3:
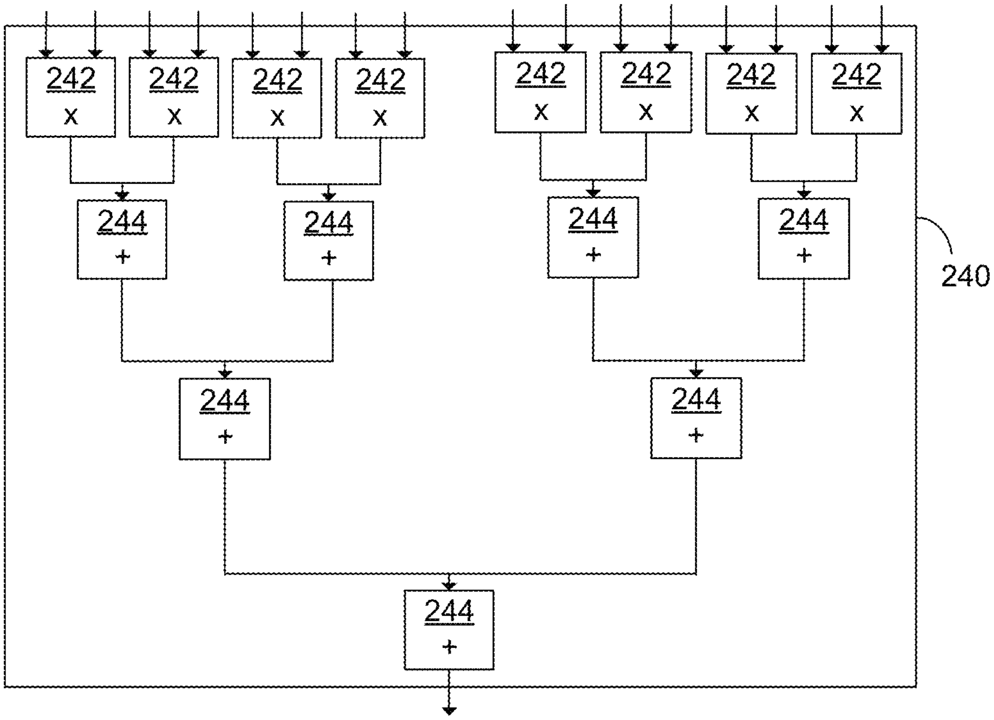
FIG. 3 is a block diagram of a convolution engine as used in FIG. 2.

FIG. 3 illustrates the structure of each of the convolution engines 240 in FIG. 2. The convolution engine 240 comprises a plurality of elements of multiply logic 242, each configured to multiply a weight by an input data element, and a plurality of elements of addition logic 244, configured in a tree structure to sum the outputs of the elements of multiply logic 242.

Exemplary Data Processing System

FIG. 4 is a block diagram of a data processing system 10 for implementing an attention-based neural network in a hardware accelerator 200 (NNA), according to an example. The data processing system comprises the hardware accelerator 200; a mapping unit 12; a memory 25; and a memory manipulation module (MMM) 40. At least the hardware accelerator 200, the memory 25, and the MMM 40 are connected by a data bus 30. The mapping unit 12 is configured to receive a definition of the neural network, and map it to a graph of elementary neural network operations that can be performed natively by the hardware accelerator 200. The mapping unit 12 is further configured to control the hardware accelerator 200 (and if necessary the MMM 40) to evaluate the attention-based neural network in fixed-function hardware, by means of these elementary operations. As part of its mapping duties, the mapping unit 12 is configured to pad each input sequence for the attention-based neural network to produce a respective padded input sequence of the appropriate, predetermined fixed length. The mapping unit is further configured to generate padding masks of the appropriate fixed length, identifying the part of each input sequence that contains the padding values, and to generate attention masks from the padding masks, as described above.

The hardware accelerator 200 is configured to process each padded input sequence and the relevant attention mask(s), to perform inference using the attention-based neural network. In particular, the hardware accelerator 200 is configured to evaluate the graph of elementary neural network operations output by the mapping unit 12. The MMM 40 is configured to manipulate multidimensional data in memory in various ways, including permute operations that modify the order of the dimensions of the data. In some examples, the MMM 40 may be configured to transform data by rearranging the channel dimension of the data in one or both of the width or height dimensions, or exchanging the channel dimension with one or both of these spatial dimensions. In alternative examples, the MMM may permute any other combination of the dimensions of the input data, including the batch dimension. A transformation from dimensions [B, C, H, W] to dimensions [B, 1, HC, W] is one example of rearranging the channel dimension in the spatial dimensions. A transformation from dimensions [B, C, H, W] to dimensions [B, C/KL, HK, WL] is another such example (where K and L are integers). A transformation from dimensions [B, C, H, W] to dimensions [B, H, C, W] is an example of exchanging the channel dimension with one of the spatial dimensions.

Figure 5:
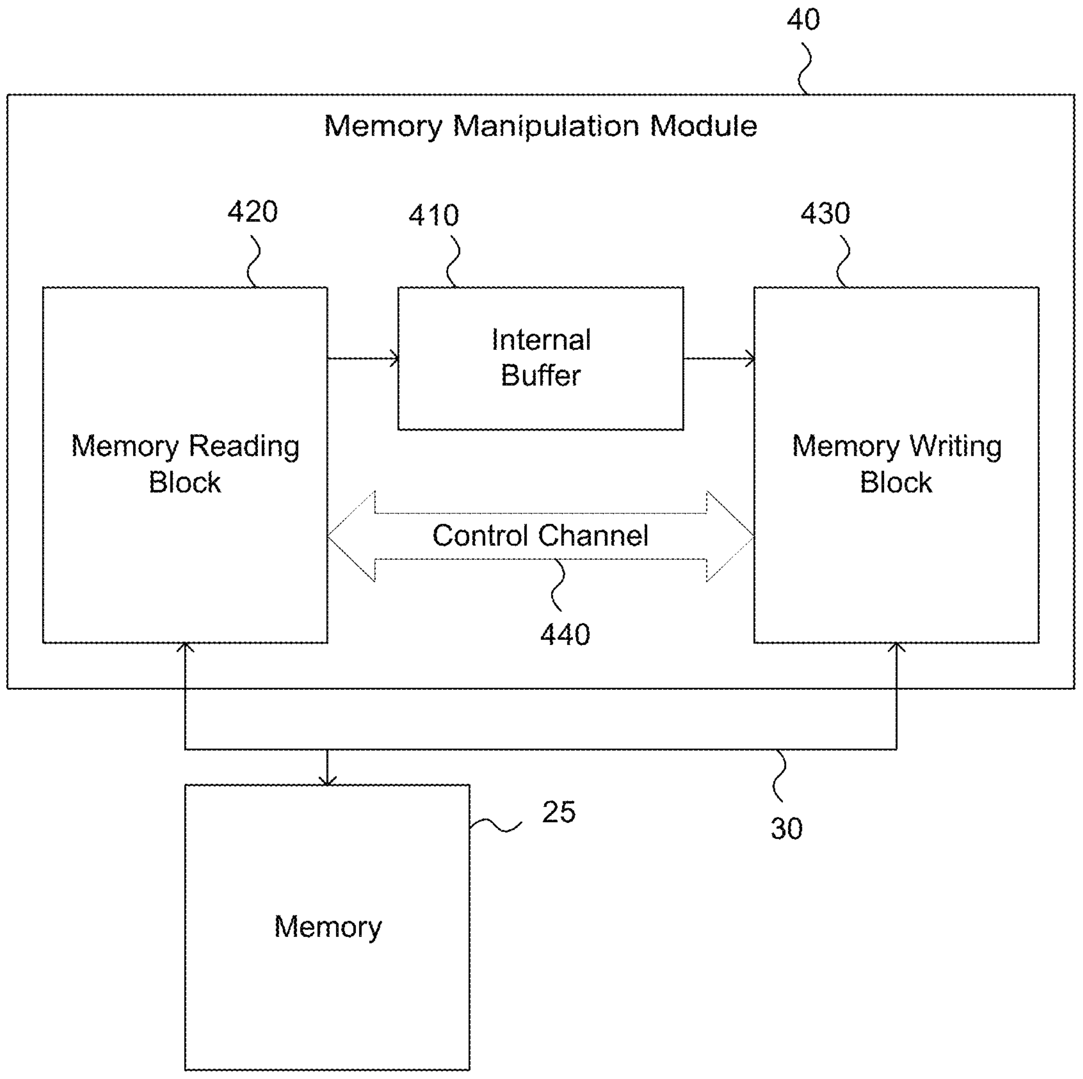
FIG. 5 is a block diagram of the memory manipulation module in FIG. 4.

FIG. 5 is a block diagram of the MMM 40 used in FIG. 4. As mentioned already, the MMM 40 is coupled to the memory 25, via the bus 30. The MMM 40 comprises a memory reading block 420; an internal buffer 410; and a memory writing block 430. A control channel 440 is used to coordinate the operations performed by the memory reading block 420 and the memory writing block 430. Both the memory reading block 420 and the memory writing block 430 are coupled to the bus 30. An output of the memory reading block 420 is coupled to an input of the internal buffer 410. An input of the memory writing block 430 is coupled to an output of the internal buffer 410.

The memory reading block 420 reads data from the memory 25. The memory reading block 420 writes the data (that was read from the memory 25) to the internal buffer 410. The memory writing block 430 reads data from the internal buffer 410 and writes the data (that was read from the internal buffer 410) back to the external memory 25. By the combination of operations performed by the memory reading block 420 and the memory writing block 430, the data may be transformed in the ways previously described. The transformation may occur when moving the data from the memory 25 to the internal buffer 410, or it may occur when moving the data from the internal buffer 410 to the memory 25. In some cases, the transformation may occur in part between the memory 25 and the internal buffer 410, and in part between the internal buffer 410 and the memory 25.

Where the memory reading block 420 and the memory writing block 430 are provided as separate hardware blocks (as in the example of FIG. 4), they may be able to operate in parallel. The control channel 240 provides for communication between the memory reading block 220 and the memory writing block 230, to maintain synchronisation between the two blocks. This synchronisation can ensure, for example, that the memory writing block 430 does not attempt to read data from the internal buffer 410 before it has been written there by the memory reading block 420. Similarly, it can ensure, that the memory reading block 420 does not overwrite data in the internal buffer 410 before it has been read from there by the memory writing block 430.

Exemplary Data Processing Method

Figure 6A:
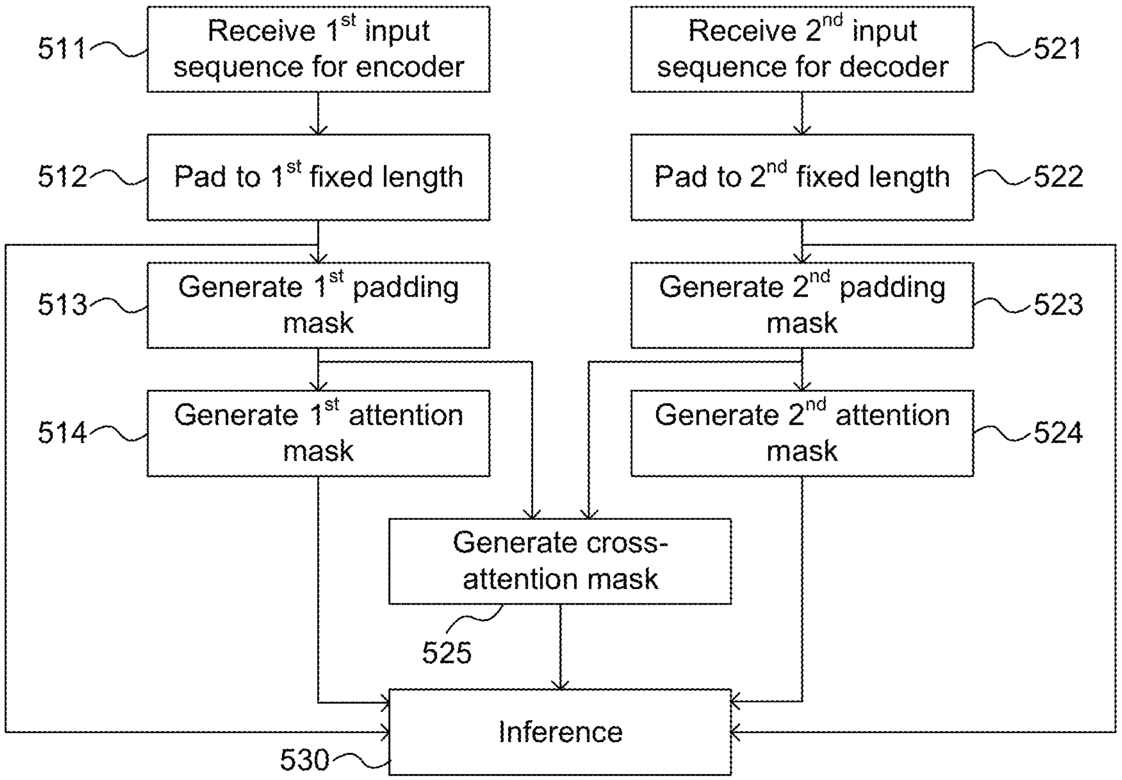
FIG. 6A is a flowchart illustrating a method of implementing inference using an attention-based neural network, according to an example.

FIG. 6A is a flowchart illustrating a method of implementing inference using an attention-based neural network, according to an example. This method is performed using the data processing system of FIG. 4. In the present example, the attention-based neural network is a transformer network comprising an encoder and a decoder (see also the description of FIGS. 1A-1C above).

In step 511, the mapping unit 12 receives a first input sequence for the encoder. In step 512, the mapping unit 12 pads the first input sequence to produce a first padded input sequence of a first fixed length. This first fixed length has been selected in advance for the encoder stack (for example, in an earlier training phase). In step 513, the mapping unit 12 generates a first padding mask, corresponding to the first padded input sequence. In the present example, the mapping unit 12 produces the first padded input sequence by padding the first input sequence with zeros in the padded locations. The first padding mask contains zeros corresponding to the padded locations, and ones in locations corresponding to the (variable length) first input sequence. In step 514, the mapping unit 12 constructs a first (self-)attention mask for the encoder based on the outer product of the first padding mask with itself, as described above. The first attention mask contains large negative values corresponding to the padded locations, and zeros in locations corresponding to the (variable length) first input sequence. The large negative values all have the same value. The particular value is chosen off-line, in advance, in a training phase. According to the present example, it is selected in conjunction with a set of numerical formats for the inference processing such that, when applied as input to the exponential function, $f(x)=e^x$, in the chosen numerical format, it returns a value of zero.

A similar sequence of steps is performed for the decoder. In step 521, the mapping unit 12 receives a second input sequence for the decoder. This is also of variable length. In general, it will be a different length to the first input sequence for the encoder. (In some examples, when performing inference using the attention-based neural network, the second input sequence may initially consist of a single "start" token.)

In step 522, the mapping unit 12 pads the second input sequence with padding values (in this example, zeros) to produce a second padded input sequence of a second fixed length. Like the first fixed length, the second fixed length may be selected off-line, in advance, in a training phase. The intention is that the first fixed length and second fixed length are chosen to be sufficiently long that all expected input sequences (for the encoder and decoder, respectively) are less than or equal to the respective fixed length.

In step 523, the mapping unit 12 generates a second padding mask, corresponding to the second padded input sequence. Similarly, to the approach taken for the encoder, the mapping unit 12 produces the second padded input sequence for the decoder by putting zeros in the padded locations. The second padding mask contains zeros corresponding to the padded locations, and ones in locations corresponding to the (variable length) second input sequence. In step 524, the mapping unit 12 constructs a second (self-)attention mask for the decoder based on the outer product of the second padding mask with itself. The second attention mask contains large negative values in locations corresponding to the padded locations, and zeros in locations corresponding to the original (variable length) second input sequence. Similar to the approach taken for the encoder, the large negative values all have the same value, which is chosen such that $f(x)=e^x=0$ in the relevant numerical format. The value and the numerical format may be the same as those for the first attention mask; however, in general the padding values and numerical formats may be chosen independently. The self-attention mask governs which elements of the second input sequence the decoder can attend to and which it must ignore. When the decoder stack is executed for a number of iterations, the second attention mask may change from one iteration to the next. This arises in natural language translation applications, for example. In each iteration, the decoder should only be able to self-attend to words that have already been translated (in previous iterations). The attention mask can be used to implement this. The self-attention mask has zeros at locations corresponding to the elements/tokens to which attention is permitted and large negative values at locations corresponding to elements/tokens which are to be ignored by the self-attention calculation.

In the example illustrated in FIG. 6A, the transformer network includes both an encoder and a decoder. Consequently, the decoder uses two attention masks. The first is a self-attention mask (the second attention mask described above), which is used in the multi-head self-attention calculation in block 111. The second is a cross-attention mask, which is used in the multi-head cross-attention calculation in block 161. As explained already above, the cross-attention mask has one dimension that is defined by the first fixed length and another dimension that is defined by the second fixed length. The dimensions of the self-attention mask are determined by the second fixed length. (It should be understood that, in other examples, if the transformer network comprises only a decoder and no encoder, blocks 161 and 171 are removed and there is no need for the cross-attention mask.)

In step 525, the mapping unit generates the cross-attention mask. The cross-attention mask governs which elements of the second input sequence the decoder can attend to and ignore with respect to the encoder output. To generate the cross attention mask, the mapping unit 12 calculates the outer product of the first padding mask (generated in step 513) with the second padding mask (generated in step 523). The mapping unit 12 then takes the result of the outer product, replaces all of the zeros with large negative values, and replaces all of the ones with zeros. The cross-attention mask therefore has zeros at locations corresponding to the elements/tokens to which attention is permitted and large negative values at locations corresponding to elements/tokens which are to be ignored by the cross-attention calculation. In particular, locations in the cross-attention mask that correspond to the padding values in either the first padded input sequence or the second padded input sequence are set to large negative values.

The various attention masks can also be modified based on external inputs. These external inputs may specify that particular additional elements of the padded input sequences should be ignored (that is, not attended to) in calculations. This allows the attention calculations to ignore elements that were present in the original (variable length) input sequences. The specified additional elements can be ignored by setting additional locations in each self-attention mask, and the cross-attention mask, to large negative values. This can be done by direct modification of the attention mask. Alternatively, it may be done by setting additional elements of the first and/or second padding masks to zero. This will result in additional large negative values after the attention masks are generated from the padding masks. (For simplicity and clarity, these steps are not shown in FIG. 6A.)

It should be understood that the self- and cross-attention mask contains zeros corresponding to elements (for example, word-tokens) that are already "available", and large negative values for a number of remaining elements that is defined by the second fixed length. It is not essential, and in some cases not particularly meaningful, to distinguish between large negative values that relate to padding and large negative values that relate to elements that are to be "ignored" in the attention calculation. In many cases, it is not known until the inference is completed what length the variable length input/output sequence of the decoder will grow to. The "length" of second input sequence is defined only by the length of the output sequence from the decoder, and cannot be known in advance. At the end of each iteration, the output of the decoder is fed back to the input, for the next iteration. Thus, for example, after the second iteration, the second padded input sequence may consist of two word-tokens—one produced in the first iteration and a second produced in the second iteration. The remainder of the second padded input sequence consists of zeros, and the locations in the second padding mask corresponding to those padding-zeros contain zeros, while the corresponding locations in the second (self-)attention mask and the cross-attention mask contain large negative values. The length of the output sequence (and therefore the input sequence) may continue to grow until either a predetermined number of iterations has been reached—for example, a number of iterations equal to the (number of elements in the) second fixed length of the second padded input sequence—or until the decoder outputs a terminate token, which stops the processing and prevents any further iterations.

In step 530, the fixed-function hardware of the hardware accelerator 200 processes the first padded input sequence, the second padded input sequence, the first (self-)attention mask, the second (self-)attention mask, and the cross-attention mask to perform the inference, using the attention-based neural network. The first padded input sequence and first (self-)attention mask are processed through the encoder 100; the second padded input sequence, the second (self-) attention mask, and the cross-attention mask are processed through the decoder 150.

It should be understood that not all examples of transformer networks include both an encoder stack and decoder stack. Some examples comprise only an encoder stack; some examples comprise only a decoder stack. In examples comprising or consisting of a decoder stack, the decoder stack may be iterated a number of times, or executed just once. The particular configuration will depend on the task being performed by the transformer network.

Figure 6B:
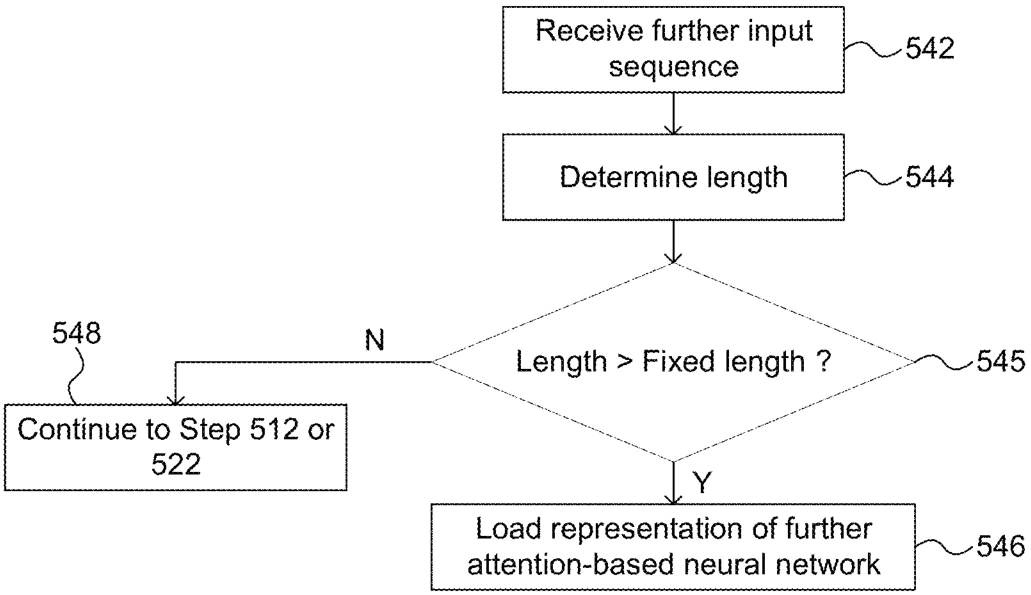
FIG. 6B is a flowchart illustrating a method for handling an input sequence that is longer than a previously selected fixed length.

Since the fixed lengths are chosen based on training data, it is possible that an input sequence may be presented in the inference phase that is longer than any of the training sequences and therefore longer than the relevant fixed length. FIG. 6B is a flowchart illustrating a method capable of responding to this eventuality. In step 542, the mapping unit 12 receives a further input sequence. In step 544, the mapping unit 12 determines the length of this further input sequence. In step 545, the mapping unit 12 identifies that the length determined in step 544 is greater than the relevant fixed length (the first fixed length in the case of an input sequence with the encoder; the second fixed length in the case of an input sequence for the decoder). In response, in step 546, the mapping unit loads a representation of a further attention-based neural network. This further network is associated with a further fixed length, which is long enough to accommodate the length of the further input sequence. That is, the further fixed length is greater than or equal to the length of the further input sequence. In some examples, the mapping unit 12 may obtain the representation of the further attention-based neural network from the on-board memory 25. The memory may store an array of different neural networks like this, which are trained for essentially the same task but which differ in the fixed length(s) that they impose on input sequences. When the mapping unit discovers that the currently loaded network is not capable of accommodating an input sequence, it may load a different (but related) network with a longer fixed length parameter. In some examples, instead of obtaining the representation of the further attention-based neural network from the on-board memory 25, the mapping unit 12 may obtain it from an external source. For instance, the mapping unit may be configured to download the representation from a remote server via a communications network such as a wireless LAN or cellular data network.

After loading the further attention-based neural network, the mapping unit proceeds to pad the further input sequence with padding values to produce a further padded input sequence of the further fixed length. It also generates a further padding mask and one or more further attention masks (depending on the structure of the network). The further padding mask identifies the part of the further padded input sequence containing the padding values. At least one further attention mask is generated from the further padding mask. The fixed-function hardware of the hardware accelerator processes the further padded input sequence, and the one or more further attention masks, to perform inference using the further attention-based neural network. According to one example, these steps are similar to steps 511, 512, 513, 514 and 530 of FIG. 6A. It should be understood that the further attention-based neural network will have the same structure as the neural network that it replaces. This may be any attention-based neural network. In particular, the further attention-based neural network may comprise only an encoder stack; or only a decoder stack; or both an encoder stack and a decoder stack. In the latter case, the further attention-based neural network would be designed to operate on first and second further input sequences, for the encoder and decoder, respectively. These would be padded to respective first and second further fixed lengths, either or both of which may be different from the first and second fixed length used in the previously loaded attention-based neural network. The one or more further attention masks will, in this case, include: a further first (self-)attention mask for the further first input sequence; a further second (self-)attention mask for the further second input sequence; and a further cross-attention mask.

In the event (at step 545) that the length of the further input sequence is less than or equal to the fixed length associated with the currently loaded network, then there is no need to load a representation of a different network. The method instead proceeds from step 545 to step 548, from where it continues to step 512 and/or 522 as normal.

(Batch) Matrix Multiplication

As already explained above, two (batch) matrix multiplications arise in each SDPA calculation (see blocks 192 and 198). Multiple instances of the SDPA calculation exists in each of the blocks 110, 111 and 161. Multiplications also arise repeatedly elsewhere in the network. For example, the feedforward layers in the feedforward blocks 130 and 131 are fully connected layers, which are implemented using (batch) matrix multiplications. It is therefore desirable to implement such batch matrix multiplications as efficiently as possible in the hardware accelerator.

A single matrix multiplication has the form $$Z = XY$$

In this equation, X is a matrix having dimensions [P, Q] and Y is a matrix having dimensions [Q, R]. The output Z is a matrix having dimensions [P, R]. Treating the matrices as 4-D tensors, X has dimensions [1, 1, P, Q], Y has dimensions [1, 1, Q, R], and Z has dimensions [1, 1, P, R].

Here, "NCHW" notation is adopted for a data tensor, where N is the number of batches, C is the number of channels, H is the height, and W is the width. Likewise, "OIHW" notation is adopted for weights/coefficients, where O is the number of output channels, I is the number of input channels, H is the kernel height and W is the kernel width.

The task of matrix multiplication can be generalised to batch matrix multiplication, which involves performing multiple matrix multiplications in the same operation. For batch matrix multiplication, the two leading dimensions of the 4-D tensors defined above are allowed to have sizes greater than one. Thus, the more general form is a tensor X with dimensions [M, N, P, Q], and a tensor Y with dimensions [M', N', Q, R]. This represents (max(M, M') max(N, N')) respective multiplications, between matrices of size [P, Q] and [Q, R], performed in the same operation.

It should be understood that the definition of batch matrix multiplication above applies to any number of dimensions greater than two. In other words, the selection of 4-D tensors is not special or important—it is just convenient for the purposes of explanation. In general, there may be any number of dimensions. The matrix multiplication is performed on two of the dimensions, and the remaining dimensions (which are referred to generically as the "batch" dimensions) all have matching sizes (or have sizes that are equal to 1, in which case broadcasting is implied). The notation [ . . . , Q, . . . ] and [ . . . , R, . . . ] will be adopted to indicate any number of additional dimensions that match in the manner described above for M, N, M', and N', with two dimensions that are subject to matrix multiplication. In this notation, the additional dimensions may be positioned in one or more of before, between and after the two dimensions that are subject to matrix multiplication. The dimension of size Q in the two input tensors may be referred to as the "inner" dimension. Here, for the sake of simplicity in the examples and without loss of generality, it will be assumed that the matrix multiplication is performed on the final two dimensions. Thus, the tensors in the examples will have dimensions [ . . . , P, Q] and [ . . . , Q, R]. However, it should be understood that this is not intended to be limiting.

Existing neural network accelerator (NNA) hardware is generally specialised in evaluating convolutional layers, and might not natively support matrix multiplication. For example, the exemplary NNA described above, with reference to FIG. 2, is adapted to multiply the same set of weights simultaneously by multiple sets of input data elements, in parallel, at multiple processing elements 240. The majority of computation in convolutional neural networks (CNNs) is for operations such as convolution, which require the same coefficients (weights) to be applied across multiple sets of input data. For this reason, some neural network accelerators are specialised towards this kind of operation. In some cases, matrix multiplication might not be natively supported by such NNAs; in other cases, it may be supported but relatively inefficient because of the way the hardware is designed.

The exemplary hardware accelerator discussed above does not lend itself to direct evaluation of matrix multiplications and batch matrix multiplications. According to aspects of the present disclosure, these operations are instead mapped to other operations, which are directly supported on the exemplary hardware accelerator. Different approaches may be adopted depending on the architecture and capabilities of the hardware accelerator. For example, in some hardware accelerators, the software or hardware might only support convolution using constant weights (coefficients) and might not support dynamic weights. This would restrict the use of convolution-based methods (see below), when wishing to multiply two matrices of dynamic data.

Faced with a desire to implement a matrix multiplication in a system using a neural network accelerator (NNA), one possibility would be to design a dedicated fixed-function hardware module that is specialised at evaluating matrix multiplication. This hardware module could then be included in the NNA, where it would take responsibility for evaluating any layers involving matrix multiplication, as needed.

Another alternative would be to evaluate the matrix multiplication in general purpose hardware outside the NNA, such as a general purpose CPU or DSP.

Providing a dedicated fixed-function hardware module in an NNA may allow for an optimised, fast evaluation. However, it has the drawback that the dedicated fixed-function hardware module occupies additional area in the integrated circuit. This area will be inactive, except when called upon to evaluate a matrix multiplication.

Meanwhile, evaluating the matrix multiplication in general purpose hardware allows for flexibility, and avoids leaving large areas of the NNA underutilised; however, it is typically less efficient, because the hardware is less specialised.

Additionally, when using general-purpose hardware that is external to the NNA, there is an overhead in transferring the necessary data from the NNA to the general-purpose hardware (for example, CPU). This typically involves the NNA writing the data to a memory, and the CPU reading the data from the memory, before evaluating the matrix multiplication. This is likely to slow down the evaluation of the matrix multiplication, especially if—as is often the case—the speed of memory access dominates. Furthermore, CPU time is often at a premium due to the requirements of the operating system and other processes being run. Spending CPU time evaluating matrix multiplications may cause these other processes to slow down and is an inefficient use of resources. The same is also true for GPUs and DSPs.

Examples according to the present disclosure provide ways to implement matrix multiplications (including batch matrix multiplications) in hardware, based on elementary neural network operations that are available on an exemplary NNA. These elementary neural network operations include element-wise operations, transformations, and convolutions. The mapping unit 12 is configured to map the (batch) matrix multiplication to a graph of elementary neural network operations. The hardware accelerator is configured to evaluate the graph of elementary neural network operations to evaluate the (batch) matrix multiplication operation. The graph may include either (a) at least one convolution operation or (b) at least one element-wise operation. The at least one convolution operation or at least one element-wise operation is evaluated in fixed-function hardware in the hardware accelerator 200.

Various examples of ways of implementing matrix multiplication operations will now be described in greater detail. Without loss of generality, in these examples, we assume that the batch size B=(max(M, M') max(N, N'))=MN, such that M>=M' and N>=N'. However, it should be understood that this is not limiting on the scope. If the batch size is different from this (for example, if M'>M and/or N'>N), the algorithms would need only replication and/or permutes and/or reshapes for the corresponding tensors. A first set of examples is illustrated in FIGS. 7-11. These examples rely upon convolution operations to evaluate matrix multiplication operations.

Figure 7:
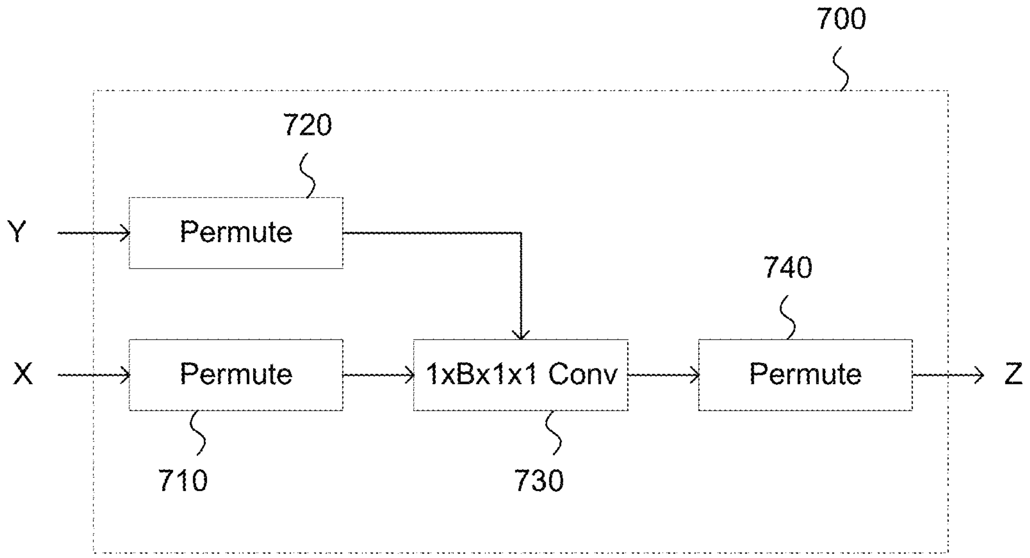
FIG. 7 illustrates a computational graph made up of elementary neural network operations for implementing a matrix multiplication using a convolution operation, according to an example.

In the computational graph illustrated in FIG. 7, the graph of neural network operations 700 for implementing a matrix multiplication comprises a convolution 730, and transformations 710, 720, 740, which are applied to the input and output of the convolution. The first tensor X will provide the data tensor for the convolution; the second tensor Y will provide the weights for the convolution. A first permute operation 710 is applied to the first tensor X. This permute operation rearranges the dimensions of X from [1, 1, P, Q] to [1, Q, 1, P]. The width dimension with size Q is placed in the channel dimension; and the height dimension with size P is placed in the width dimension.

In the present implementation, it is preferred to use a width dimension greater than one for data tensor X, because the hardware accelerator 200 is configured to parallelise over the width dimension when performing convolutions, for example by processing adjacent windows across the convolution engines 240. In another implementation, the hardware accelerator might be configured to parallelise over the height dimension. In such a case, it might be advantageous to instead leave the height dimension in place, such that the reconfigured first tensor would have dimensions [1, Q, P, 1].

A second permute operation 720 is applied to the second tensor Y. This operation rearranges the dimensions of Y from [1, 1, Q, R] to [R, Q, 1, 1]. Thus, the height dimension with size Q is placed in the input channel dimension. The width dimension with size R is placed in the output channel dimension. The first and second permute operations are examples of first transformations, to prepare the input data before the multiplication calculations are performed.

The matrix multiplication can then be implemented by a 1×1 convolution 730, using the reconfigured first tensor X as data, and using the reconfigured second tensor Y as weights. The convolution 730 has R filters, Q input channels, stride 1 and no padding. The output of this convolution will have dimensions [1, R, 1, P]. A third permute operation 740 is applied to this, to restore the dimensions to the configuration corresponding to the original inputs X and Y. Following the permute 740, the result Z of the matrix multiplication has dimensions [1, 1, P, R]. The third permute operation is an example of a second transformation, applied to the results of the multiplication calculations, to restore data such that the dimensions are in a desired order. Usually, this will match the ordering of the dimensions of the input data. It should be understood that the second transformation (third permute operation 740) may be eliminated in some circumstances. In particular, if the neural network includes two successive matrix multiplications, then the output of the convolution 730 in the first of these matrix multiplications may be passed directly to an input of the convolution 730 in the second matrix multiplication (eliminating also the second permute operation 710 in the second matrix multiplication). In essence, the third permute operation 740 in the first matrix multiplication and the first permute operation 710 in the second matrix multiplication cancel one another out. In this way, the first permute operation 710 may be performed only at the start of a sequence of successive matrix multiplications, and the third permute operation may be performed only at the end of that sequence.

Figure 8:
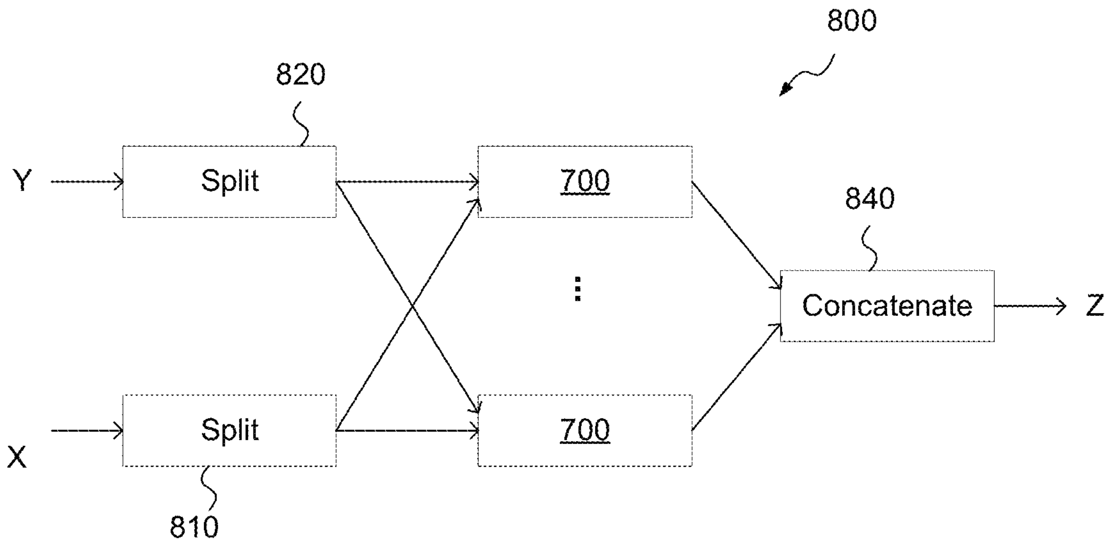
FIG. 8 illustrates a computational graph made up of elementary neural network operations for implementing a batch matrix multiplication using convolutions, according to an example.

FIG. 8 extends the approach of FIG. 7 to construct a graph of neural network operations 800 for implementing a batch matrix multiplication. The approach taken in FIG. 8 is to split the batch matrix multiplication into individual matrix multiplications, and to implement each of the individual matrix multiplications using the approach of FIG. 7. The first tensor X, which has dimensions [M, N, P, Q], is split 820 into MN constituent matrices each having dimensions [1, 1, P, Q]. For the second tensor Y, if broadcasting is required (that is, if M'=1 and/or if N'=1), then the relevant dimensions of Y are repeated making it of shape [M, N, Q, R]. The second tensor Y is split into MN constituent matrices each having dimensions [1, 1, Q, R]. The respective pairs of constituent matrices are each multiplied together using the graph of neural network operations 700 in the computational graph shown in FIG. 7. Each of these implements the matrix multiplication as a convolution 730, and produces a respective tensor of dimensions [1, 1, P, R]. If broadcasting is involved, then this can be handled by feeding the same constituent matrix to multiple instances of the operations 700. The results of the MN operations are then concatenated 840, to construct the result of the batch matrix multiplication with dimensions [M, N, P, R].

Figure 9:
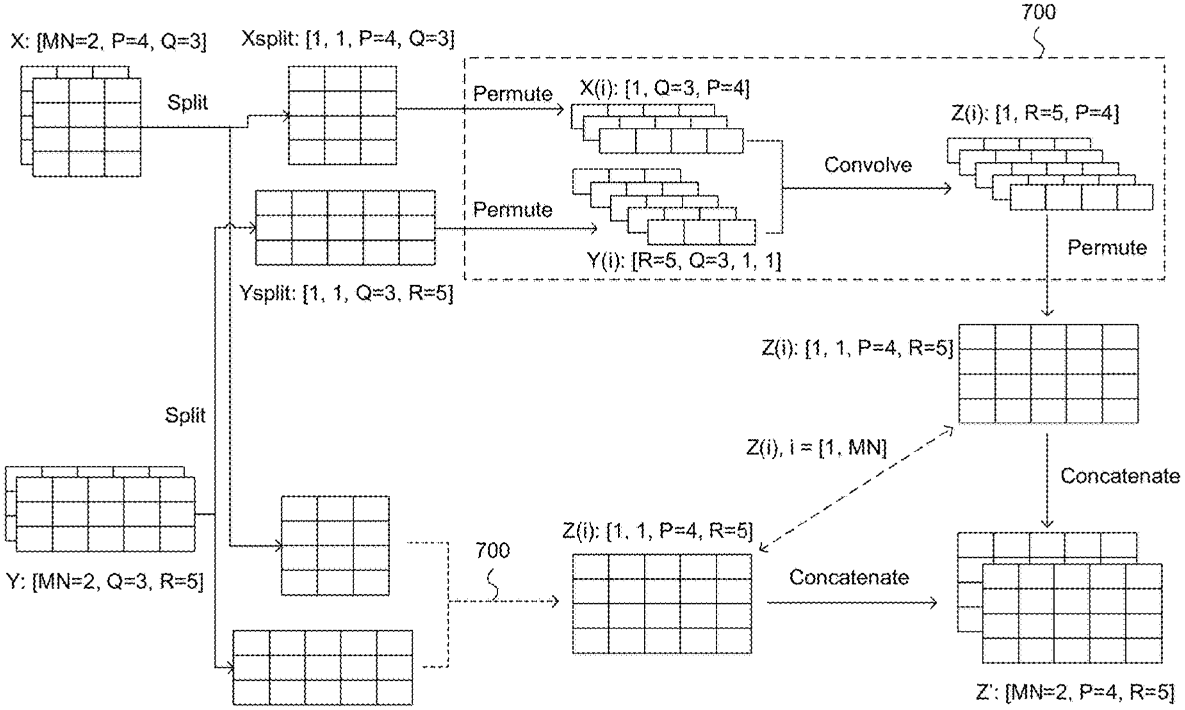
FIG. 9 shows a practical instance of batch matrix multiplication, based on the computational graph in FIG. 8.

FIG. 9 shows one specific instance relying on the approach of FIGS. 7-8. A batch matrix multiplication is performed between a first tensor X with dimensions [MN=2, P=4, Q=3] and a second tensor Y with dimensions [MN=2, Q=3, R=5]. Here, without loss of generality, we are considering only the combined size MN of the individual dimensions M and N. The method works in the same way, irrespective of whether M=1 and N=2, or M=2 and N=1. The first tensor X is split 810 into two tensors each of dimensions [1, 1, 4, 3]. Each of these is permuted 710 into a first reconfigured tensor of dimensions [1, 3, 1, 4]. The second tensor Y is split 820 into two tensors of dimensions [1, 1, 3, 5], each of which is permuted 720 into a second reconfigured tensor of dimensions [5, 3, 1, 1]. Each first reconfigured tensor (acting as data) is convolved 730 with the respective second reconfigured tensor (acting as weights), to produce an output with dimensions [1, 5, 1, 4]. These are permuted 740 to have dimensions [1, 1, 4, 5] and concatenated 840 to produce an output tensor Z with dimensions [MN=2, P=4, R=5].

Figure 10:
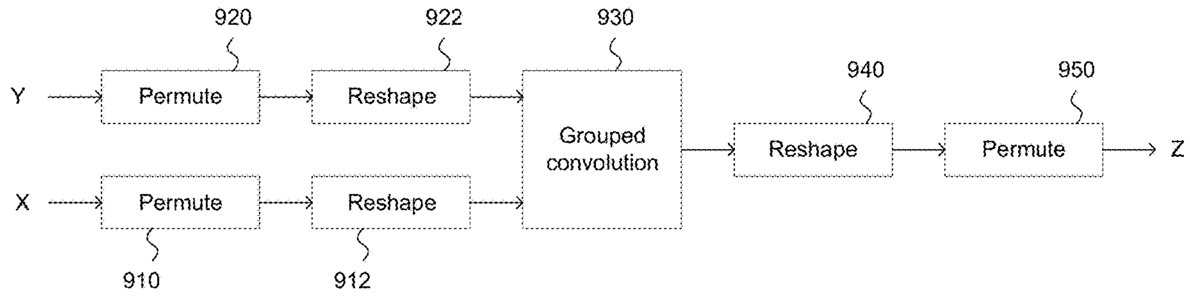
FIG. 10 illustrates a computational graph made up of elementary neural network operations for implementing a batch matrix multiplication using a grouped convolution, according to an example.
Figure 11:
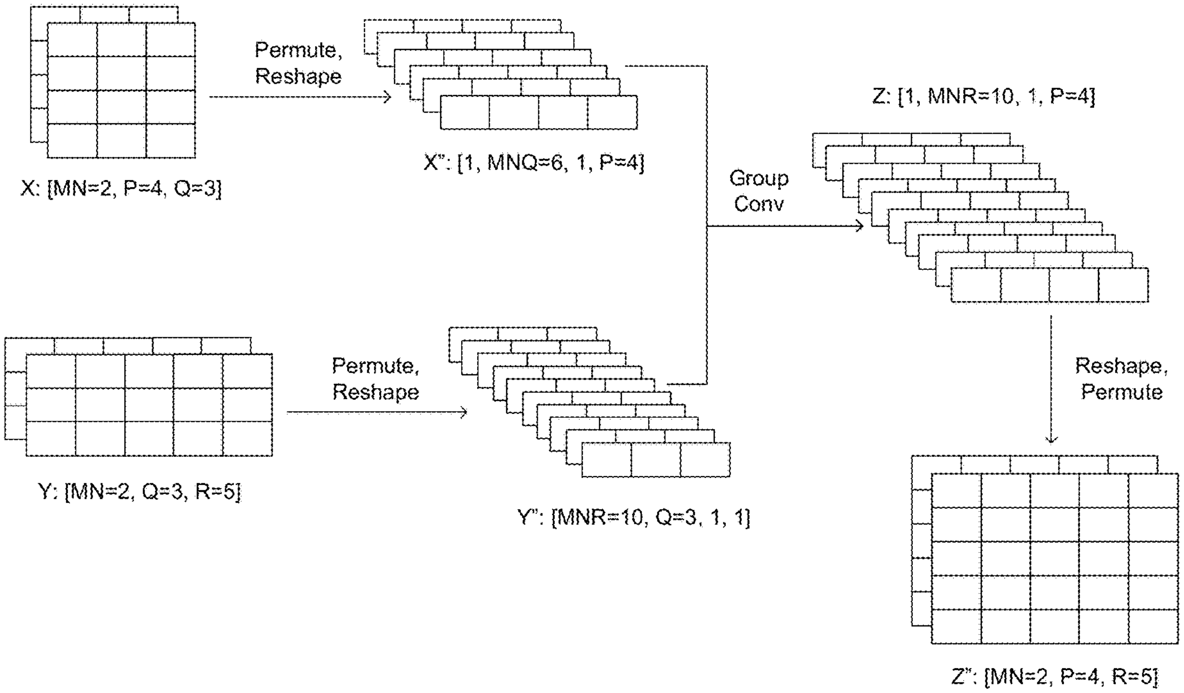
FIG. 11 shows a practical instance of batch matrix multiplication, based on the computational graph in FIG. 10.

FIG. 10 shows a computational graph comprising a graph of neural network operations that offer another way of implementing a batch matrix multiplication—this time using a grouped convolution. A specific instance applying this method is illustrated in FIG. 11. The first input tensor X (having dimensions [M, N, P, Q]) is permuted 910 to a tensor of dimensions [M, N, Q, P]. It is then reshaped 912 to a tensor of dimensions [1, MNQ, 1, P]. The second input tensor Y (having dimensions [M', N', Q, R]) is permuted 920 to a tensor of dimensions [M', N', R, Q] and then reshaped 922 to a tensor of dimensions [M'N'R, Q, 1, 1]. If broadcasting is required (that is, if M'=1 and/or if N'=1), then this can be implemented by repeating the relevant dimensions appropriately in Y thereby making it of shape [MNR, Q, 1, 1]. A grouped convolution 930 is then performed, using the first reconfigured tensor [1, MNQ, 1, P] as data and the second reconfigured tensor [MNR, Q, 1, 1] as weights. There are MN groups each having Q channels. This produces a tensor of dimensions [1, MNR, 1, P], which is firstly reshaped 940 to have dimensions [M, N, R, P] and then permuted 950 to produce the output tensor Z with dimensions [M, N, P, R]. The specific instance in FIG. 11 uses input tensors X and Y with the same dimensions as those of FIG. 9, for ease of comparison. If the batch matrix multiplication is part of a sequence of consecutive multiplications, then the final permute operation 950 might not be necessary. In a similar manner to that discussed above for FIG. 7, the initial permute 910 of the next batch multiplication in the sequence effectively cancels with the final permute 950 of the preceding batch multiplication.

Figure 12:
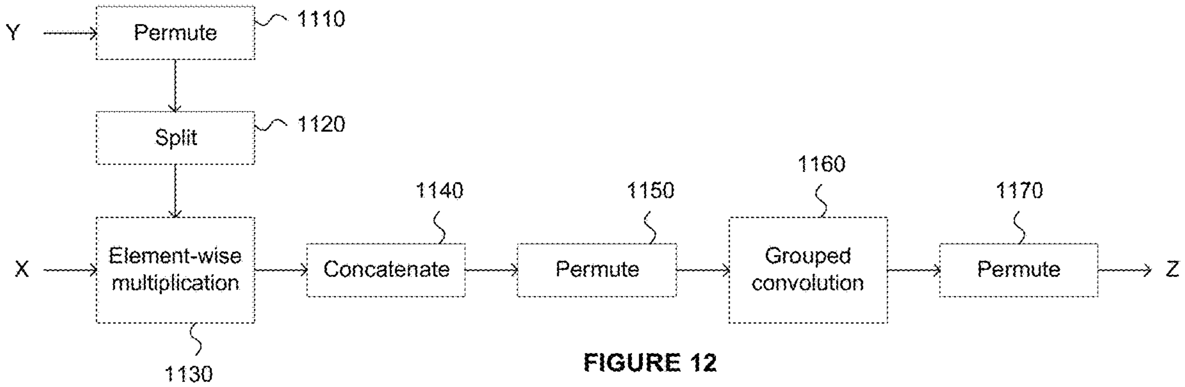
FIG. 12 illustrates a computational graph made up of elementary neural network operations for implementing a batch matrix multiplication using element-wise operations, according to an example.
Figure 13:
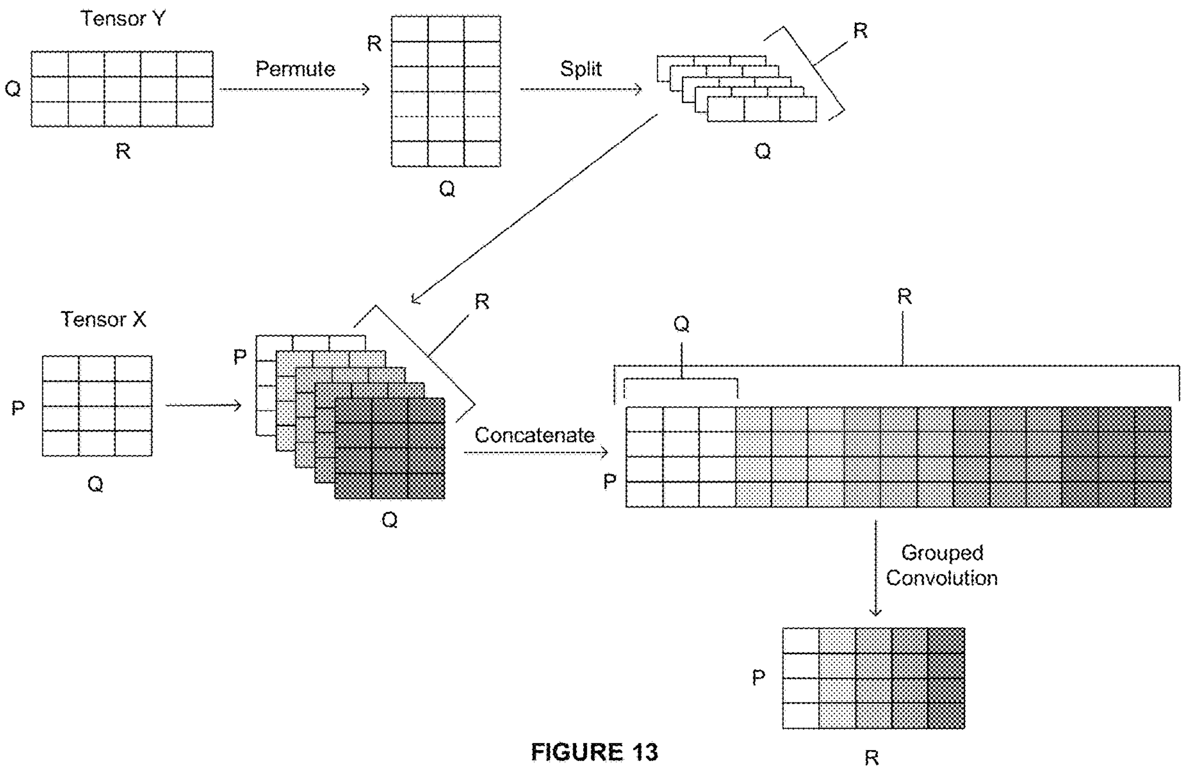
FIG. 13 shows a practical instance of a matrix multiplication, based on the computational graph in FIG. 12.

There are various alternative ways of implementing matrix multiplication operations. A second set of examples is illustrated in FIGS. 12-13. These examples rely upon element-wise operations to evaluate matrix multiplication operations.

FIG. 12 illustrates a computational graph for implementing a batch matrix multiplication using element-wise multiplication, according to an example. For the second tensor Y, if broadcasting is required (that is, if M'=1 and/or if N'=1), then the relevant dimensions of Y are repeated making it of shape [M, N, Q, R]. A permute operation 1110 is applied to the second tensor Y, to reconfigure it into a third tensor having dimensions [M, N, R, Q]. The third tensor is then split 1120, along the height dimension, into R constituent tensors, each of dimensions [M, N, 1, Q]. Element-wise multiplication 1130 is performed between each one of these R constituent tensors and the first tensor X. Recall that the first tensor X has dimensions [M, N, P, Q]; therefore, this element-wise multiplication involves broadcasting over at least the height dimension. Alternatively, the constituent tensors may be replicated explicitly P times over the height dimension, prior to the element-wise multiplication. The output of the element-wise multiplication 1130 consists of R tensors, each having dimensions [M, N, P, Q]. These tensors are concatenated 1140 along the width dimension, producing a tensor of dimensions [M, N, P, RQ]. Next the concatenated tensor is permuted 1150 to reconfigure it into a tensor of dimensions [M, RQ, N, P]. Essentially this operation arranges the results of the element-wise multiplication along the channel axis, in R groups of size Q. The next task is to sum over each group of Q channels. In the present example, this is done by means of a grouped convolution 1160, using a weight tensor consisting entirely of ones and having dimensions [R, Q, 1, 1]. The output of this grouped convolution 1160 has dimensions [M, R, N, P]. In a final step, this tensor is permuted 1170 to reconfigure it into the output Z, with dimensions [M, N, P, R].

FIG. 13 shows a practical instance of a matrix multiplication, based on the computational graph in FIG. 12. Note that—in contrast to FIG. 12—in FIG. 13, the arrows represent operations and the tensors are represented as blocks. In this example, the first tensor X has dimensions [1, 1, 4, 3] and the second tensor Y has dimensions [1, 1, 3, 5]. In step 1110, the second tensor is permuted to produce a third tensor having dimensions [1, 1, 5, 3]. In step 1120, this third tensor is split into 5 constituent tensors each of size [1, 1, 1, 3]. In step 1130, each of the 5 constituent tensors is multiplied element-wise by the first tensor X. This produces 5 respective tensors, each one having dimensions [1, 1, 4, 3]. These are concatenated in step 1140 along the horizontal (width) dimension, to produce a concatenated tensor with dimensions [1, 1, 4, 15]. The width dimension now contains 5 groups of 3 elements in each of the 4 rows. The concatenated tensor is permuted 1150 to reconfigure it with dimensions [1, 15, 1, 4]. (Note that this step is not illustrated in FIG. 13.) Grouped convolution 1160 is performed on this tensor, using a weight tensor of dimensions [5, 3, 1, 1] to sum the groups of 3. The result of this summation/grouped convolution has dimensions [1, 5, 1, 4]. This is permuted 1170 to produce the final output Z, having dimensions [1, 1, 4, 5].

Note that the grouped convolution used in the preceding example is just one way to sum the groups of elements as required. It is possible to implement this step in other ways. For example, starting from the concatenated tensor having dimensions [1, 1, 4, 15], one could instead construct a convolution operation with a row of ones [1, 1, 1, 3], using a stride of 3 in the horizontal direction, and apply this to implement the summation.

Although FIG. 13 illustrates the graph of neural network operations being applied to a single matrix multiplication (M=N=1), the method is general and applies also for batch matrix multiplications (MN>1) without modification.

The MMM can be used to implement the various permute, reshape, split and concatenate operations, as required. Element-wise operations can be implemented using the element-wise operations unit 285. Convolutions (including grouped convolutions) can be carried out using the convolution engines 240. In this way, all of the neural network operations in the graph of neural network operations may be implemented in fixed-function hardware.

Softmax

As already explained above, a Softmax calculation arises in each instance of an SDPA calculation. Additionally, although not shown explicitly in FIGS. 1A and 1B, the prediction heads at the outputs of either the encoder stack or the decoder stack may comprise a linear projection and a further Softmax. This Softmax may be used for classification, for example, to identify the most likely class from a vector of class probabilities.

A softmax layer performs, for any value $x_j$ in a set or vector of values, the operation:

$$s(x_j) = \frac{e^{x_j}}{\sum_i e^{x_i}}$$

In order to drop the subscript notation, this equation can be rewritten in terms of a vector x:

$$s(x) = \frac{e^x}{\sum_{z \in x} e^z}$$

Softmax maps input values in the range (−∞, +∞) to outputs in the range [0,1]. Furthermore, the sum of the output values is 1 (as required for a discrete probability distribution).

It is known that the evaluation of a softmax layer may suffer from numerical instability problems if the input values x are large in magnitude. The input x may have such large positive values that overflow occurs in the output of the exponential $e^x$, or such large negative values that underflow occurs. Even when overflow does not occur, with large values of x, some of the exponential values $e^x$ may be so large in comparison with others that the normalisation is no longer reliable.

A solution to at least some of these issues is to subtract the maximum value from all values in the tensor (or vector) x:

$$s(x) = \frac{e^{x-M}}{\sum_{z \in x} e^{z-M}}$$

Where M=max(x). This redefined layer is identical to the definition above but is more stable numerically. The subtraction of the maximum reduces the range of the input from (−∞, +∞) to (−∞, 0], but does not affect the result.

Faced with a desire to implement a softmax layer using a neural network accelerator (NNA), similar considerations apply as for the matrix multiplication operation discussed above. Implementing the operation using natively supported elementary operations has advantages over each of the potential alternative possibilities.

Figure 14A:
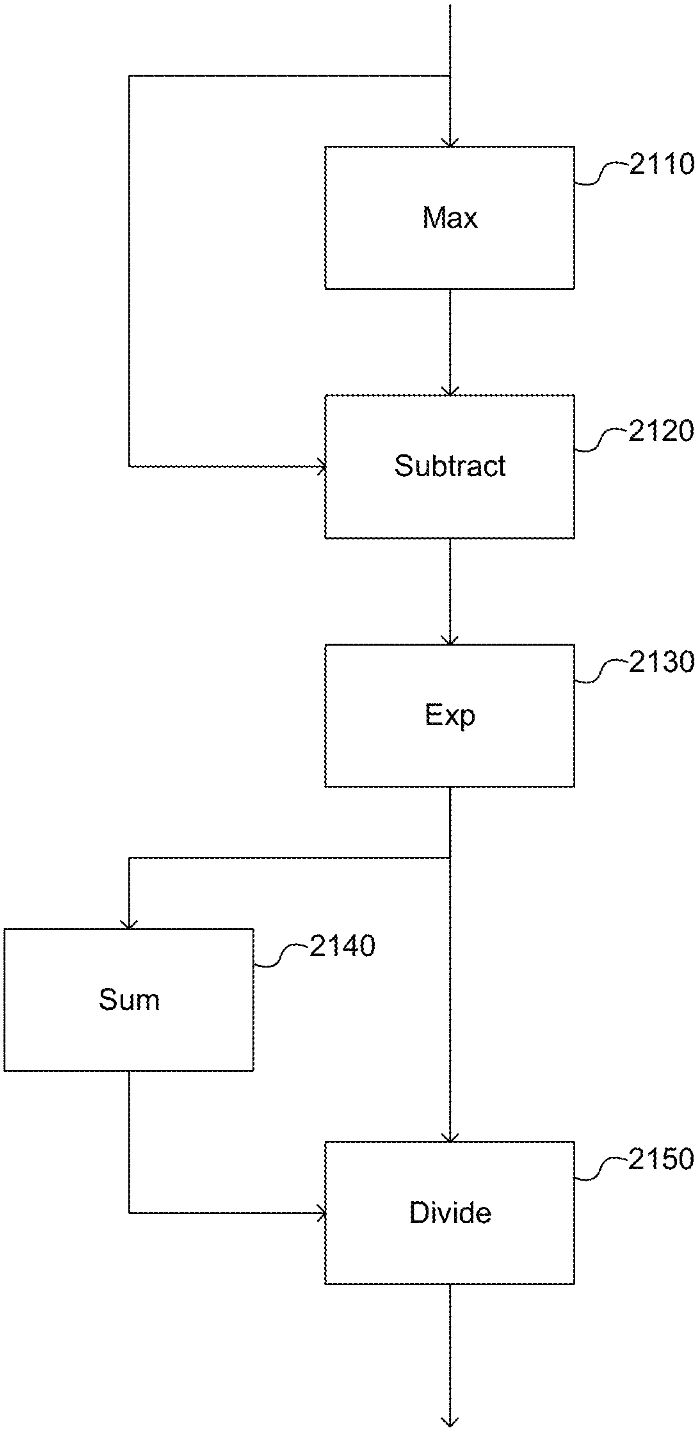
FIG. 14A shows a computational graph of a softmax layer.

Examples according to the present disclosure provide ways to implement a softmax layer in hardware, based on elementary neural network operations that are available on an exemplary NNA. The softmax layer can be viewed as a computational graph, as shown in FIG. 14A, and the individual operations in the graph can each be replaced with one or more operations in the NNA hardware. The graph containing these substituted operations can then be evaluated by the NNA.

Examples according to the present disclosure use elementary neural network operations, executed by fixed-function hardware units, to implement a softmax layer. In the present implementation, the calculations are performed in fixed point arithmetic. Experiments have shown that the fixed point implementation is sufficiently accurate that it does not significantly degrade the overall accuracy of the exemplary neural networks tested.

A softmax layer may be constructed from the following operations:

A maximum operation;

A subtraction;

An exponential operation implementing the function $f(x) = e^x$;

A summation; and

A division.

For each of these operations, there may be more than one way that the operation can be restructured for execution on the hardware accelerator. The operations will be explained in turn in more detail below.

FIG. 14A is a computational graph illustrating how the operations available in the exemplary NNA can be used to implement a softmax layer. In this example, an exemplary input tensor x will be considered, the tensor having batch, height, width, and channel dimensions. In this example, it is assumed that the softmax layer is to be evaluated over the channel dimension of the input. It should be understood that the softmax layer could be evaluated over one or more other dimensions, and that it may be applied to tensors with any number of dimensions ordered in any way.

First, the input tensor x undergoes a maximum operation 2110. This operation is performed over the dimension or dimensions in which the softmax layer is to be evaluated. In the current example of channel-wise softmax, this operation is performed along the channel dimension. Where the softmax layer is evaluated over a different dimension or dimensions, the maximum operation 2110 would instead be performed along that different dimension or dimensions. The maximum operation 2110 returns the largest positive value over the relevant dimension(s) within x, to produce a tensor of maximum values M. In subtraction operation 2120, also referred to as the first subtraction, the tensor of maximum values M is subtracted from the respective elements of the tensor x. (This can be implemented using broadcasting, as discussed in further detail below). This subtraction operation 2120 results in a negative-shifted tensor x−M. The negative-shifted tensor is input to an exponential operation 2130. This calculation applies each element of the negative-shifted tensor as a power of Euler's number e. The exponential operation 2130 results in a tensor of exponentiated values, referred to herein as the exponential tensor $e^{x-m}$. The exponential tensor $e^{x-m}$ undergoes a summation 2140. This summation sums all of the elements of the exponential tensor along the dimension or dimensions in which the softmax layer is to be evaluated (in the current example, the channel dimension), resulting in a tensor containing the sum of the exponentiated values $\rho e^{x-M}$. In division operation 2150, the exponentiated values are divided by their sum. This returns the output of the softmax layer:

$$\frac{e^{x-M}}{\sum e^{x-M}}.$$

Figure 14B:
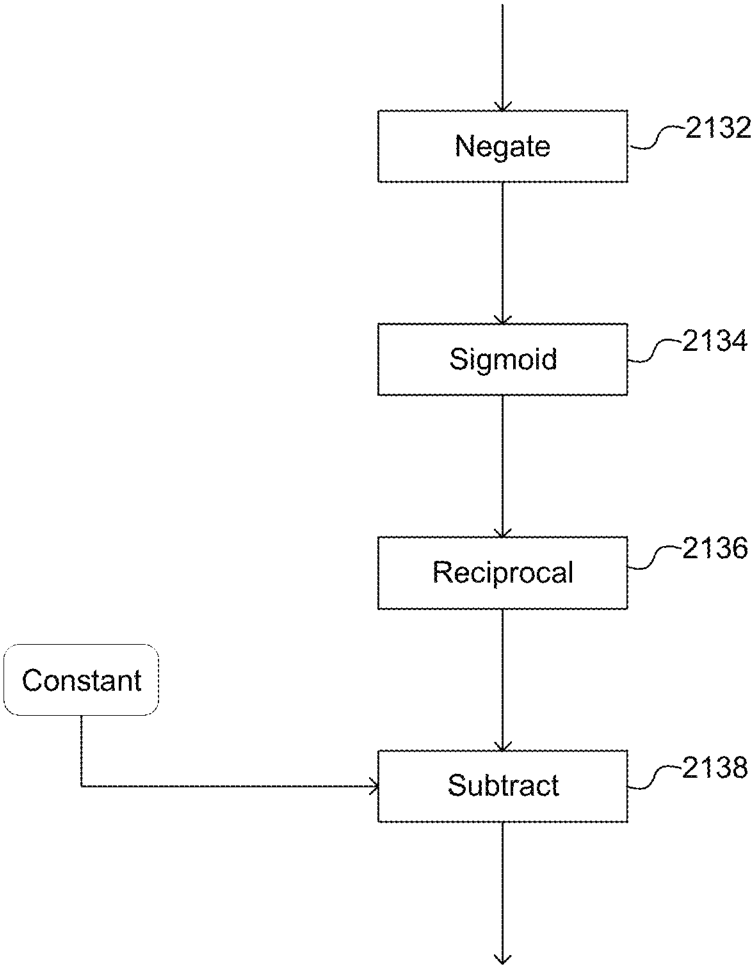
FIG. 14B is a computational graph showing one way of calculating the exponential operation in FIG. 14A.

FIG. 14B is a computational graph illustrating an example of how the operations available in the exemplary NNA can be used to implement the exponential operation 2130. According to this example, the exponential operation 2130 consists of the following operations:

A negation 2132;

A sigmoid function 2134;

A reciprocal operation 2136; and

A second subtraction 2138.

Continuing with the example of FIG. 14A, the input for the exponential operation 2130 is the negative-shifted tensor x−M. This tensor undergoes a negation 2132 to produce a negated tensor −(x−M). The negation 2132 may be implemented in a variety of ways—for example, by subtracting the negative-shifted tensor from 0, or by subtracting the negative-shifted tensor from itself twice. The negated tensor is input to a sigmoid function 2134, which determines a sigmoid value for each element of the negated tensor. The output of the sigmoid function 2134 is a tensor of sigmoid negated values σ(−(x−M)). The tensor of sigmoid negated values undergoes a reciprocal operation 2136, which determines the reciprocal of each of the sigmoid negated values. The sigmoid operation 2136 returns a tensor of reciprocal sigmoid values $$\frac{1}{\sigma(-(x-M))}.$$

Finally, the tensor of reciprocal sigmoid values undergoes a second subtraction 2138, to subtract a constant (one) from each element of the tensor. This returns the exponential tensor $$\frac{1}{\sigma(-(x-M))} - 1,$$

which is identical to $e^{x-M}$.

Two possible implementations of the maximum operation 2110 will be explained with reference to FIGS. 15A, 15B, 15C, and 16. As was explained with reference to FIGS. 14A and 14B, and as shown again in FIGS. 15A and 16, the maximum operation 2110 receives an input tensor and returns the maximum value of the elements over the channel dimension. The channel dimension is given as an example because softmax is most commonly applied over the channel dimension. However, it should be understood that the scope of the present disclosure is not limited to this example.

The maximum operation 2110 can be implemented:

In the pooling unit 275; or

In the element-wise operations (EWO) unit 285.

These units may be assisted by transpose or permute operations performed, for example, in the memory manipulation module 40.

Figure 15A:
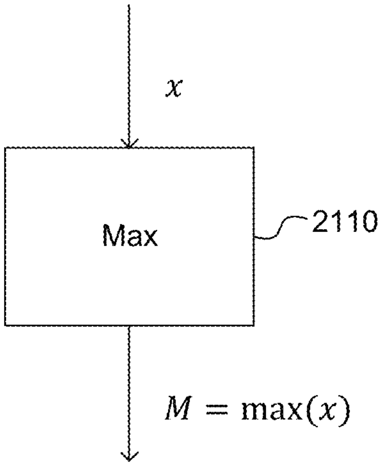
FIG. 15A illustrates a maximum operation.
Figure 15B:
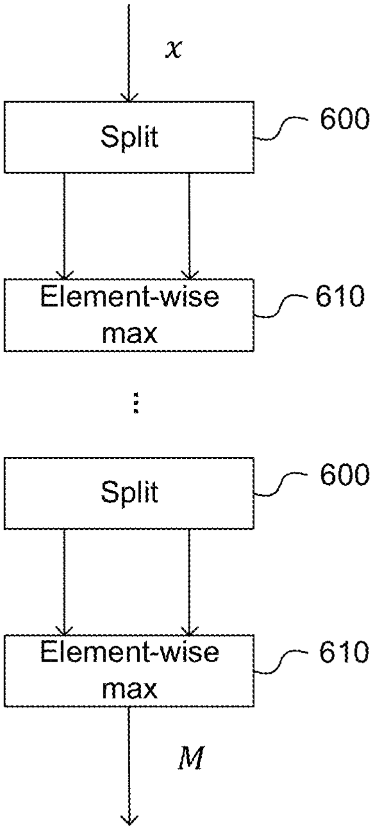
FIG. 15B is a computational graph illustrating one approach for implementing the maximum operation of FIG. 15A.

FIG. 15B illustrates an implementation of the maximum operation 2110 using the EWO unit 285. An iterative sequence of pairwise maximum operations can be used. The input tensor is split 600 in two on the dimension on which we are computing softmax (the channel dimension in the present example), and the two halves are compared using an element-wise maximum operation 610. For each pair of elements compared, the higher (that is, maximum) of the two is output as the result of the element-wise maximum 610. The result of this operation is a tensor that is half the size of the original. This is itself split in two, and the two halves are compared using a further element-wise maximum operation 610. This process continues iteratively, halving the number of values in each iteration, until the overall maximum values over the channel dimension are found. If the tensor does not have a size that is a power of 2, along the dimension over which the maximum operation is to be applied, then padding may be necessary, to increase the size to the nearest power of 2. The tensor could be padded with zeros, in some examples. If the values in the original tensor are all negative, this will cause the maximum operation to instead return a maximum value of zero. Alternatively, for better conditioning of the softmax layer, the padding could be done with a very large negative value, or by copying one or more existing values in the original tensor. This would be less likely to affect the calculation of the maximum. (In the case of one or more copied values or by using the largest representable negative value, it would be guaranteed not to affect the calculation).

Figure 15C:
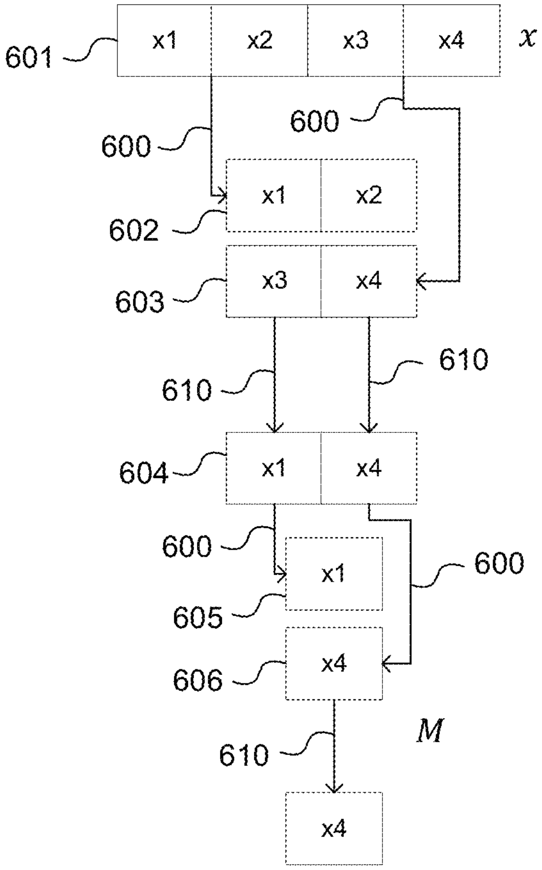
FIG. 15C shows a way of determining the maximum of a tensor by successive element-wise comparisons.

FIG. 15C illustrates the application of the iterative element-wise maximum approach to an exemplary input tensor—here a vector "x" 601, for simplicity. The input vector 601 has 4 channels, each containing a numerical value represented by x1, x2, x3 and x4. First, the vector 601 is split 600 into two sub-vectors 602, 603 each having two elements. Using an element-wise maximum operation 610, the first element of the first sub vector 602 is compared with the first element of the second sub-vector 603. Similarly, the second element of the sub-vector 602 is compared with the second element of the sub-vector 603. This comparison results in a vector 604. In the example of FIG. 15C, x1>x3 and x4>x2; therefore, the vector 604 output by the first element-wise maximum operation consists of x1 and x4. The vector 604 is split 600 to produce a sub-vectors 605 and 606, which are again compared using the element-wise maximum operation 610. This returns the maximum element "M" of the input vector 601—which, in this example, happens to be x4. While this example used a vector having 4 elements, the process applies in the same fashion to vectors having more elements or to tensors with more dimensions. It can also be applied over dimensions other than the channel dimension.

Figure 15D:
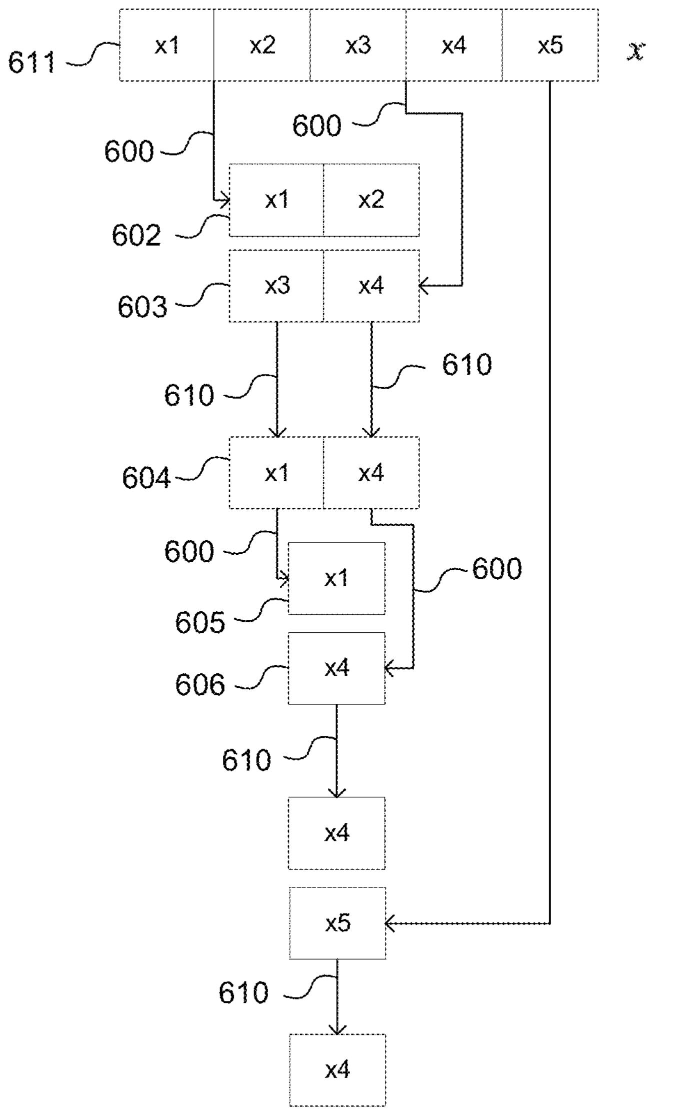
FIG. 15D shows another example of determining a maximum by successive element-wise comparisons.

An alternative to padding is to split the tensor into more than two sub-tensors, each sub-tensor having a size in the relevant dimension that is a power of 2. For example, a tensor with 5 channels may be split into two tensors with 2 channels each and a final tensor with 1 channel. The two tensors with 2 channels can be reduced by splitting and taking the element-wise maximum, as described above. The resulting 1-channel tensors can be compared to produce a tensor with 1 channel. Finally, this tensor can be compared with the remaining tensor with 1 channel, to return the maximum of the original tensor on the channel dimension. This process is illustrated by way of example in FIG. 15D. The exemplary input tensor, the vector "x" 611, differs from the input in FIG. 15C by the addition of a fifth channel, containing a numerical value x5. The first four channels are processed as illustrated in FIG. 15C. This is then followed by a final, additional step, in which the maximum over the first four channels, x4, is compared with the fifth channel, x5, in a further element-wise maximum operation 610. The result of this comparison is the overall maximum over the five channels. (In this example, as illustrated, the maximum happens still to be x4).

The splitting operation may be performed by the memory manipulation module 40, by reading data from one location and writing a first part of the data to a first location and a second part of the data to a second location. Alternatively, the splitting might not require a separate operation, and may instead be performed as part of the output of the preceding operation. In the example of FIG. 15B, the output of the element-wise maximum 610 may be split by writing a first part of the output to a first location in the memory 25 and a second part of the output to a second location in the memory 25.

Figure 16:
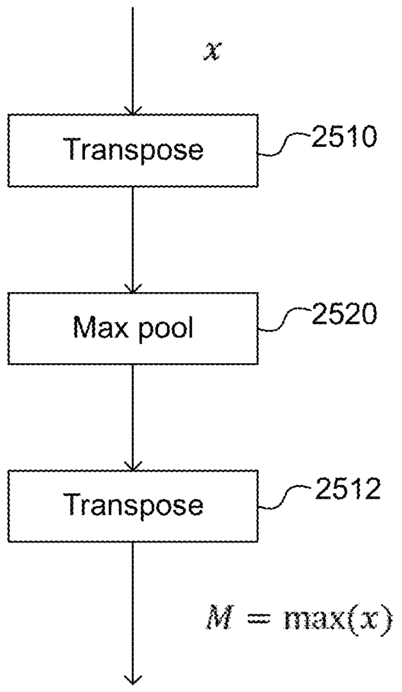
FIG. 16 is a computational graph illustrating an alternative approach for implementing the maximum operation of FIG. 15A.

FIG. 16 illustrates the implementation of the maximum operation 2110 using the pooling unit 275. As mentioned at the outset above, in the present example softmax is applied over the channel dimension. Therefore, the maximum operation 2110 is also applied over the channels. To facilitate implementing the maximum operation 2110 in the pooling unit 275, a transpose or permute operation 2510 can be applied to the input tensor before the maximum pooling operation 2520 is performed by the pooling unit 275. This is done because, in the exemplary hardware accelerator, the pooling unit is specialised at pooling over spatial dimensions. In order to pool the channel elements of the input, the channel dimension is transposed with one of the spatial dimensions. (This can be done using the MMM 40). Then, the result of the maximum pooling operation 2520 can be transformed back to the original dimensions of the input by another transpose or permute operation 2512 that inverts the transpose or permute operation 2510 to restore the original ordering of the dimensions. (Again, this can be done using the MMM 40). If softmax is being performed in the spatial dimensions (for example, the height and/or width dimensions) then these transpose operations might not be needed. Similarly, where the pooling unit 275 is designed to operate in the channel dimension, transpose operations might not be necessary. In some cases, the pooling unit 275 may have a maximum window size that is smaller than the size of the dimension(s) over which the maximum is to be calculated. If this arises, the max pooling can be iterated a number of times, in order to calculate the maximum over the larger set of values.

The subtractions 2120, 2138 and the negation 2132 can be performed by the element-wise operations unit 285. The element-wise operations unit can perform a respective subtraction operation on each element of a tensor. Where a constant is subtracted—as in the subtraction 2138—the subtraction may be performed either by the element-wise operations unit 285 or by the activation unit 255. Subtraction of a constant (for example, subtraction of 1) can be implemented in the activation unit by loading the function y=x−c into the LUT, where c is the constant to be subtracted. Subtraction of a constant can be implemented as an element-wise addition in the element-wise operations unit, by adding the negative of the constant (for example, adding −1). Similarly, the negation 2132 could be performed either by the element-wise operations unit 285 (by subtracting the input tensor from a constant, 0), or by the activation unit 255 (by loading the function y=−x into the LUT).

In the present example, the negation 2132 is performed by subtracting each element of the tensor from zero. It could also be performed by element-wise subtraction in other ways—for example, by subtracting the tensor from itself twice, or multiplying every element of the tensor by two and subtracting the result from the original tensor. Alternatively, the negation may be performed by changing the sign bit of each element of the tensor where a sign and magnitude representation of numbers is used. Where a two's complement representation is used, the negation may be performed by inverting all of the bits representing the number and then adding one.

The exponential operation 2130 receives an input and raises e to the power of that input. For an input of x, the output of the exponential operation 2130 is $e^x$.

The exponential operation could be evaluated:

1. Directly in a lookup table (LUT), in the activation unit 255;
2. By means of a sigmoid function 2134, reciprocal 2136, negation 2132 and subtraction 2138 as shown in FIG. 14B; or
3. By means of a reciprocal sigmoid function, negation 2132 and subtraction 2138.

The first implementation is relatively straightforward, provided that the hardware and software of the hardware accelerator allows the LUT to be programmed with the exponential function. However, this might not always be possible. Therefore, the second implementation may be used as an alternative.

The second implementation makes use of the following identity:

$$e^x = \frac{1}{\sigma(-x)} - 1$$

Where σ(−x) is the negative sigmoid function. Here, in common with most literature in the field of neural networks, we use the term "sigmoid" synonymously with "logistic function". That is, the sigmoid (logistic) function is defined as:

$$\sigma(x) = \frac{1}{1 + e^{-x}}$$

The negative sigmoid function is therefore:

$$\sigma(-x) = \frac{1}{1 + e^{x}}$$

The second implementation uses elementary neural network operations to implement the steps shown in FIG. 14B. The negation 2132 and subtraction 2138 can be evaluated by the EWO unit 285, as explained above. The sigmoid function 2134 can be evaluated by the activation unit 255, as a sigmoid activation. In other words, instead of loading the exponential function into the LUT, the sigmoid function is instead loaded and evaluated. Because the sigmoid is a common activation function, it is likely to be available natively in the activation unit 255. Thus, in this case, the exponential operation is implemented indirectly by means of a sigmoid activation (together with other elementary operations).

The reciprocal 2136 of the value of σ(−x) can be evaluated in several ways, depending on the exact capabilities of the hardware accelerator 200. The options for evaluation of a reciprocal include:

A reciprocal lookup in the LUT of the activation unit 255

Using the LRN unit 265; and

An element-wise division, using the EWO unit 285.

In the present example, the reciprocal function is performed using the LRN unit. Each of the three options will be described in greater detail below.

Referring once again to FIG. 14B, in principle, the sigmoid function 2134 and the reciprocal 2136 could be combined, if both are implemented by means of lookups in an LUT. Rather than carry out two lookups in two LUTs, the functions could be combined and a single lookup performed. That is, the LUT of the activation unit 255 could be programmed to contain a reciprocal sigmoid function $$f(x) = \frac{1}{\sigma(x)}.$$

Going one step further, the negation 2132 could also be subsumed into the LUT, so that it returns the result of the function $$f(x) = \frac{1}{\sigma(-x)}.$$

In practice, however, it is likely that if the LUT were fully programmable in this way, it would be easier to simply program it with the exponential function.

Figure 17A:
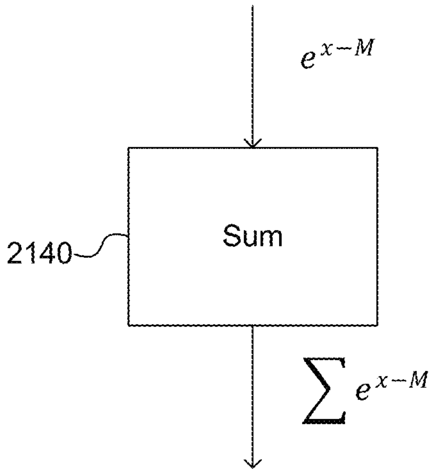
FIG. 17A illustrates a summation operation.
Figure 17B:
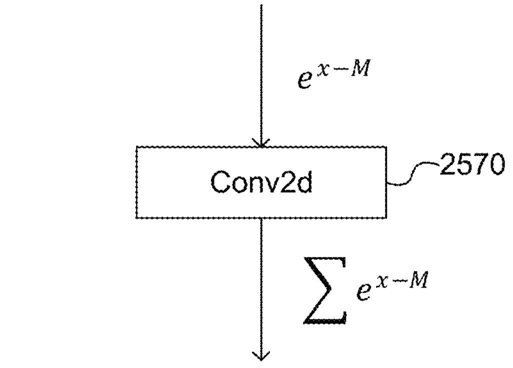
FIG. 17B is a computational graph illustrating one way in which the summation operation of FIG. 17A can be mapped to an elementary neural network operation.

The summation 2140, shown in FIG. 17A, can be implemented by a 1×1 convolution with a kernel of ones, using the convolution engines 240. The convolution operation 2570 is shown in FIG. 17B. Using the example of FIGS. 14A and 14B, consider the exponential tensor $e^{x-M}$. This tensor has dimensions B×C×H×W, with B batches, C channels, H rows and W columns. To evaluate a softmax layer over the channel dimension, the elements of the exponential tensor must be summed over the channel dimension. In other words, elements sharing the same height, width and batch location but in different channels will be summed together. This summation 2140 is performed by convolving 2570 the input tensor with a kernel having dimensions 1×C×1×1, where the kernel has dimensions $O \times I \times K_H \times K_W$, where I is the number of input channels, O is the number of output channels, $K_H$ is the kernel height and $K_W$ is the kernel width. Each element of the kernel has a value of one. The kernel is convolved 2570 across the height, width and batch dimensions of the input tensor. The result of this process is a tensor that contains the summation of the elements of the exponential tensor across the channel dimension.

Where a softmax layer is evaluated over one or more spatial dimensions, a depth-wise convolution may be used, meaning that the kernel is applied to each channel separately. In this case, the kernel would have a size of one in the channel dimension and a size greater than one in the height and/or width dimensions. If the hardware accelerator is limited to a certain maximum kernel size, it may be necessary to iterate the convolution in order to capture all elements of the input tensor, in a similar manner to that described above for the max pooling operation. It should be understood that in other examples, the softmax layer may be evaluated over other combinations of dimensions, such as the channel dimension and one or more spatial dimensions. The convolution kernel will be adapted according to the relevant dimensions.

Alternatively, the summation 2140 could be implemented by the EWO unit 285 using iterated pairwise addition operations. This approach is very similar to the element-wise maximum operation explained in relation to FIGS. 15B and 15C. The difference is that instead of implementing an element-wise maximum operation after each split, an element-wise addition operation is used. Each element of the sub vector produced in this operation is the sum of two respective elements of the vectors on which it operated. The split and addition processes are repeated until all the elements have been summed over the channel dimension. Similarly to the maximum operation of FIGS. 15B and 15C, it may be necessary to pad the tensor beforehand, so that its size in the relevant dimension is a power of 2 (that is, its size is $2^P$, where P is a positive integer). In this case, because the element-wise operation is addition, the tensor should be padded with zeros. As with the maximum operation, padding may be avoided by instead splitting the input tensor into more than two sub-tensors, each having a size in the relevant dimension that is a power of 2.

The reciprocal 2136 can be implemented:

Using the LRN unit 265;

Using the activation unit 255, by loading a reciprocal function into an LUT of the activation unit; or As an element-wise division, using the element-wise operations unit 285, by dividing a constant, 1, by the input values whose reciprocal is to be calculated.

If the LUT of the activation unit 255 is available, and is programmable, it can be programmed with a reciprocal function $f(x)=1/x$.

The LRN unit 265 may be used, in particular, if the LUT is not available or if it is not programmable to implement arbitrary functions. The LRN unit 265 is designed to carry out the following LRN calculation:

$$b_{i,x,y} = a_{i,x,y} \Bigg/ \left(k + \alpha \sum_{j=max\left(0,i-\frac{n}{2}\right)}^{min\left(N-1,i+\frac{n}{2}\right)} (a_{j,x,y})^2\right)^{\beta}$$

By setting α=1, β=1, k=n=0, this function can be reduced to $$b_{i,x,y} = a_{i,x,y} / (a_{i,x,y})^2$$

Which is identical to the desired reciprocal:

$$b_{i,x,y} = 1 / a_{i,x,y}$$

Either of these two solutions can be used to evaluate reciprocals. Both ways of evaluating reciprocals can also be useful for evaluating division operations, as explained further below. Alternatively, as mentioned above, the reciprocal could itself be implemented by means of an element-wise division, in the element-wise operations unit 285 (assuming that element-wise division is supported).

In the evaluation of the exponential operation as shown in FIG. 14B, the reciprocal 2136 (for example, implemented by the LRN unit 265) produces a reciprocal tensor $$\frac{1}{\sigma(-(x-M))},$$

which is passed to the subtraction operation 2138 (for example, implemented by element-wise subtraction in the EWO unit 285).

In some examples, division 2150 (reproduced in FIG. 18A) may be performed directly by means of an element-wise division operation, using the element-wise operations unit 285. However, some hardware accelerators 200 might not support element-wise division. For such eventualities, it is desirable to be able to implement the division in other ways.

Figure 18A:
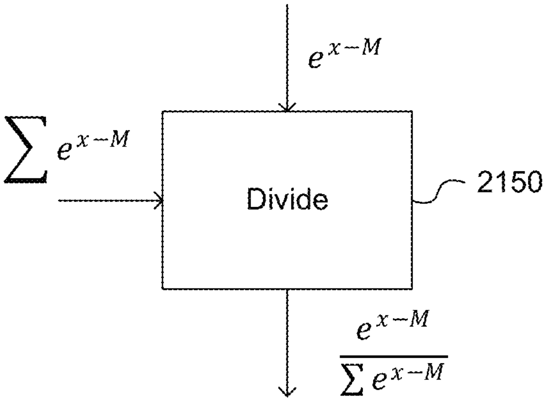
FIG. 18A illustrates a division operation.
Figure 18B:
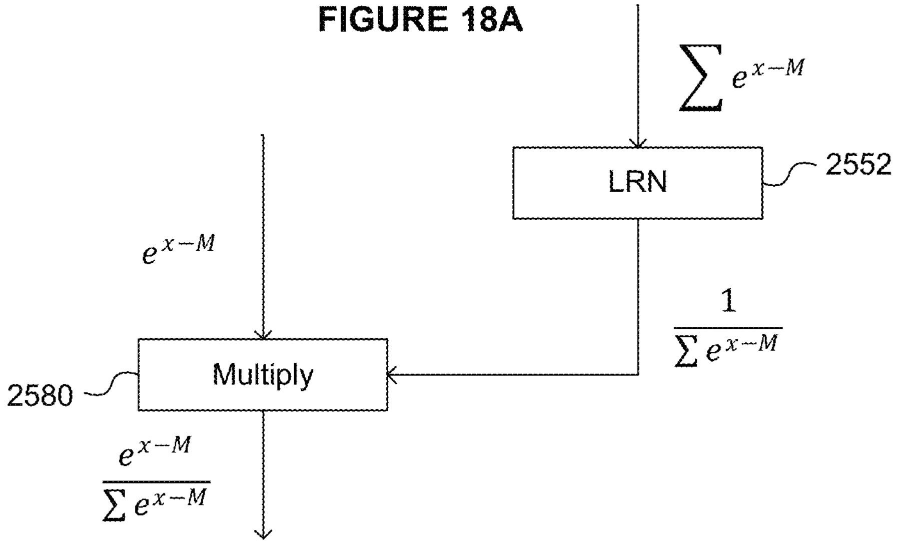
FIG. 18B is a computational graph illustrating one way in which the division operation of FIG. 18A can be mapped to elementary neural network operations.
Figure 18C:
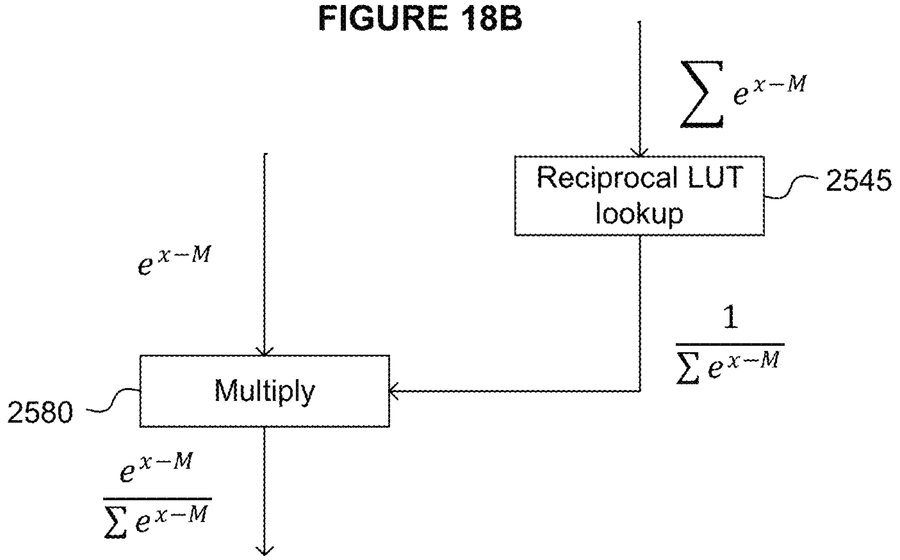
FIG. 18C is a computational graph illustrating an alternative way in which the division operation of FIG. 18A can be mapped to elementary neural network operations.

FIGS. 18B and 18C show two alternative ways to implement the division 2150 shown in FIG. 18A—in particular, if it cannot be performed directly by the EWO unit 285. Both of these approaches exploit the recognition that a division can be evaluated as a combination of a reciprocal operation and a multiplication. In both cases, the multiplication 2580 can be performed by the EWO unit 285.

FIG. 18B illustrates the use of an LRN operation 2552 to evaluate the reciprocal. Using this method, in the context of the example of FIG. 1A, the reciprocal of the tensor containing the sum of the exponentiated values $\Sigma e^{x-M}$ can be evaluated. The reciprocal tensor is passed to the EWO unit 285, where it is multiplied 2580 with the exponential tensor $e^{x-M}$, to return the output of the softmax layer.

FIG. 18C illustrates an alternative to the method of FIG. 18B, in which a reciprocal lookup 2545 in the LUT of the activation unit 255 is used instead of the LRN 2552 to implement the reciprocal. In some cases, if the activation unit 255 is programmable to implement arbitrary functions, such as the reciprocal function, it may be preferable to use the activation unit 255 to carry out a reciprocal lookup 2545 (as shown in FIG. 18C) instead of using the LRN unit 265 to perform an LRN operation 2552 (as shown in FIG. 18B). A lookup may be faster and more energy efficient than an LRN operation once the reciprocal function has been loaded into the LUT.

Layer Normalisation

As already explained above, with reference to FIGS. 1A and 1B, layer normalisation arises in each of blocks 120, 121, 140, 141, and 171. Layer normalisation applies the following normalisation over its inputs x:

$$y = \left(\frac{x - E[x]}{\sqrt{\mathrm{Var}[x] + \epsilon}}\right)\gamma + \beta$$

Here, E[x] is the mean of the input data and Var[x] is its variance. The layer normalisation first subtracts the mean from the input data, and then scales it by the reciprocal of the standard deviation. The constant E has a small positive value, and is included for numerical stability, to avoid divide-by-zero cases. In the present example, $\epsilon=0.00001$. These operations normalise the data to have zero mean and unit standard deviation. The multiplicative parameter $\gamma$ then scales the data to have standard deviation equal to $\gamma$. Finally, the additive parameter $\beta$ shifts the data to have a mean equal to $\beta$.

The layer normalisation operation can be implemented in at least three ways in the fixed-function hardware of the exemplary hardware accelerator 200. These will be described with reference to FIGS. 19A-19C.

Figure 19A:
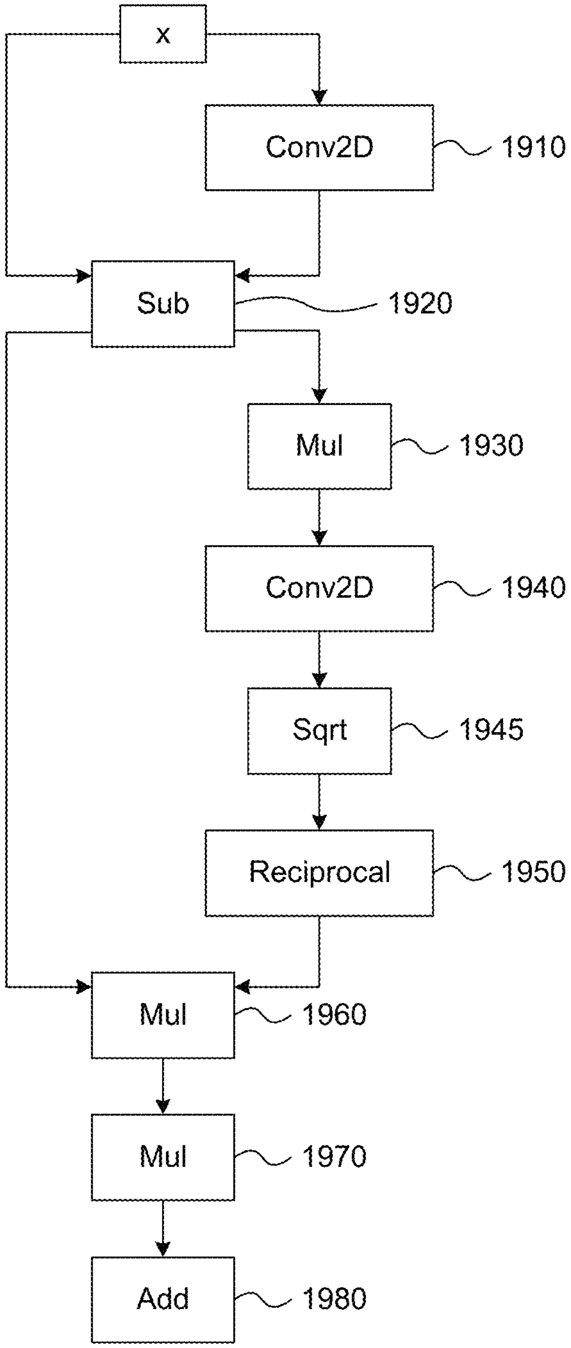
FIGS. 19A-19C illustrate three different computational graphs for implementing a layer normalisation.

FIG. 19A shows a computational graph for implementing a layer normalisation according to a first example. The mean of the input data is calculated using a convolution operation 1910 (performed by the convolution engines 240). The mean is then subtracted from the original input data, using a subtraction operation 1920. This can be done using the element-wise operations unit 285. The output of the subtraction operation 1920 is squared in a multiplication operation 1930. Again, this can be done using the element-wise operations unit 285. A second convolution operation 1940 sums the squares that were output by the multiplication 1930, thereby calculating the variance of the input data. The standard deviation is calculated as the square root of the variance. The square root operation 1945 may be implemented using the local response normalisation unit 265. The standard deviation is passed to a reciprocal operation 1950. This may be implemented using an LUT in the activation unit 255 (although it could also be implemented in other ways). It is noted that the order of the square root operation 1945 and the reciprocal operation 1950 could be reversed, in other examples. In principle, the results should be identical; in practice, there may be slight differences, because of rounding or other numerical effects. The mean-subtracted data produced by the subtraction operation 1920 is then multiplied by the reciprocal of the standard deviation, in multiplication operation 1960. This can be implemented as an element-wise multiplication in the element-wise operations unit 285. The scaling factor $\gamma$ is applied in a further element-wise multiplication operation 1970. Finally, the additive offset $\beta$ is applied in an element-wise addition operation 1980.

Figure 19B:
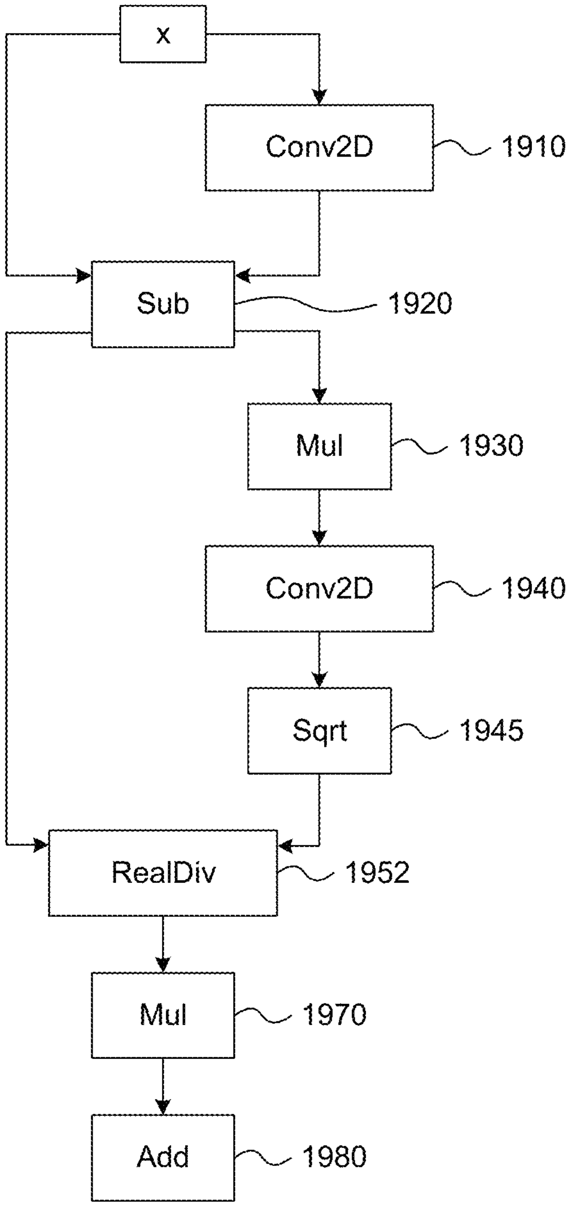

The computational graph of FIG. 19B is similar in many ways to that of FIG. 19A, and identical operations are indicated by the same reference numerals. The only difference is in the implementation of the division operation. Whereas in FIG. 19A this was implemented as a reciprocal 1950 followed by a multiplication 1960, in the computational graph of FIG. 19B it is implemented directly as an element-wise division 1952. This can be performed using the element-wise operations unit 285.

Figure 19C:
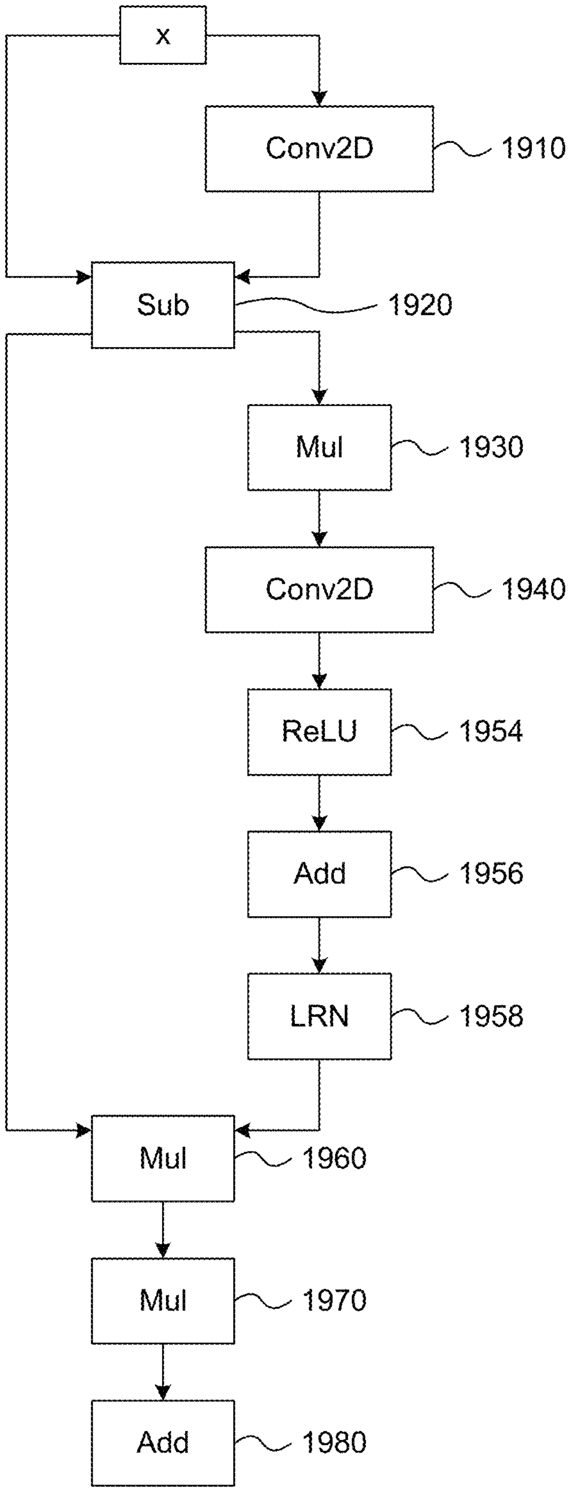

The computational graph of FIG. 19C again differs only in the implementation of the division operation. Similarly to FIG. 19A, the division is implemented as a reciprocal followed by a separate multiplication 1960. In FIG. 19C, the reciprocal is implemented in three steps. A rectified linear activation function (ReLU) is applied by the activation unit 255, in step 1954. Addition operation 1956 adds a small positive constant (for example, $1\times10^{-10}$), to avoid the possibility of division by zero in the next step. This is a local response normalisation, performed by the LRN unit 265. The output of the LRN is the reciprocal of the standard deviation. For this task, the LRN unit is configured to calculate the inverse square root of its input. This can be achieved by appropriate setting of the parameters passed to the local response normalisation. In the present example, the parameters are depth_radius=0, bias=0.0, alpha=1.0, beta=0.75. These parameters have the same meanings given to them in the implementation of local response normalisation in TensorFlow Core v1.15.0: depth_radius is the half-width of the normalisation window; bias is an offset; alpha is a scale factor; and beta is an exponent.

The method selected for implementing the layer normalisation will typically depend on the precise capabilities of the target hardware accelerator. Not all hardware accelerators might implement the element-wise division operation directly, for example. And different methods of implementing the reciprocal might perform slower or faster on different platforms.

Format Selection

Figure 20A:
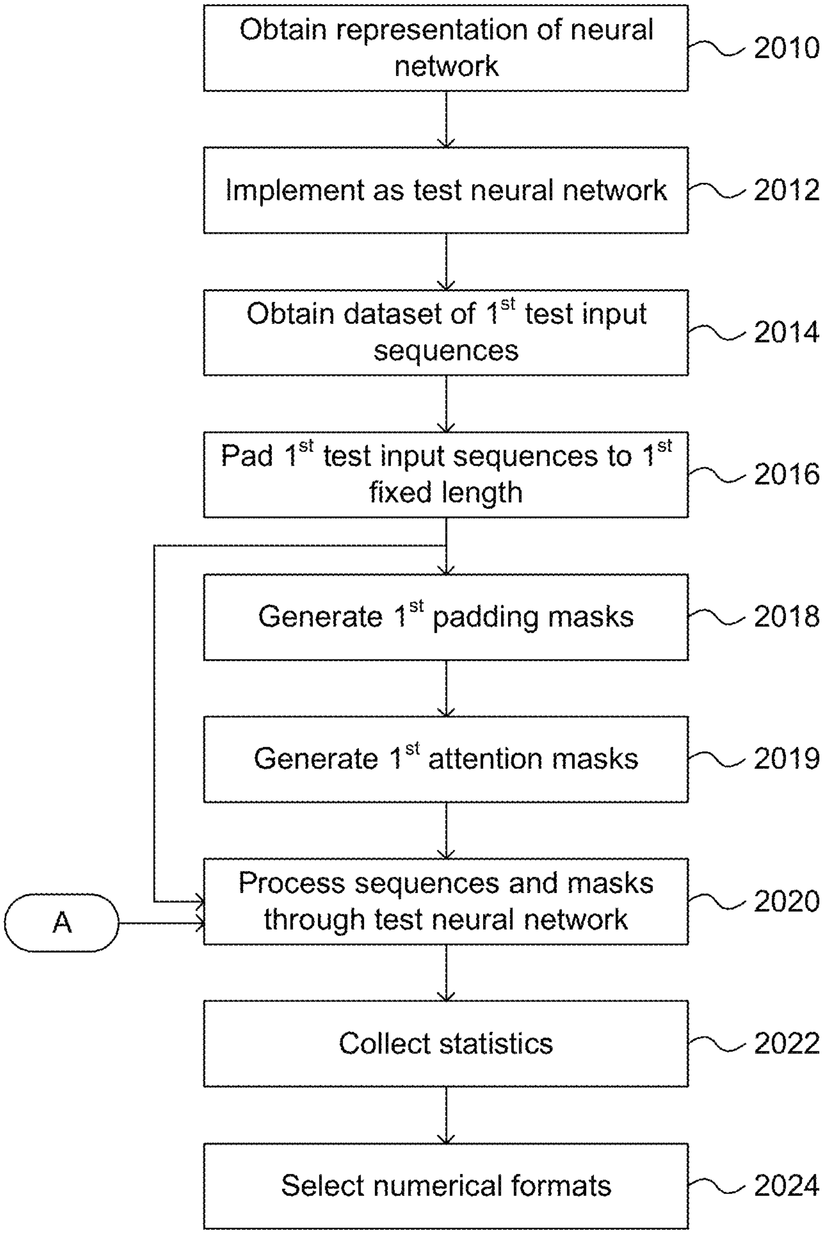
FIG. 20A is a flowchart illustrating a method for selecting numerical formats, according to an example.
Figure 20B:
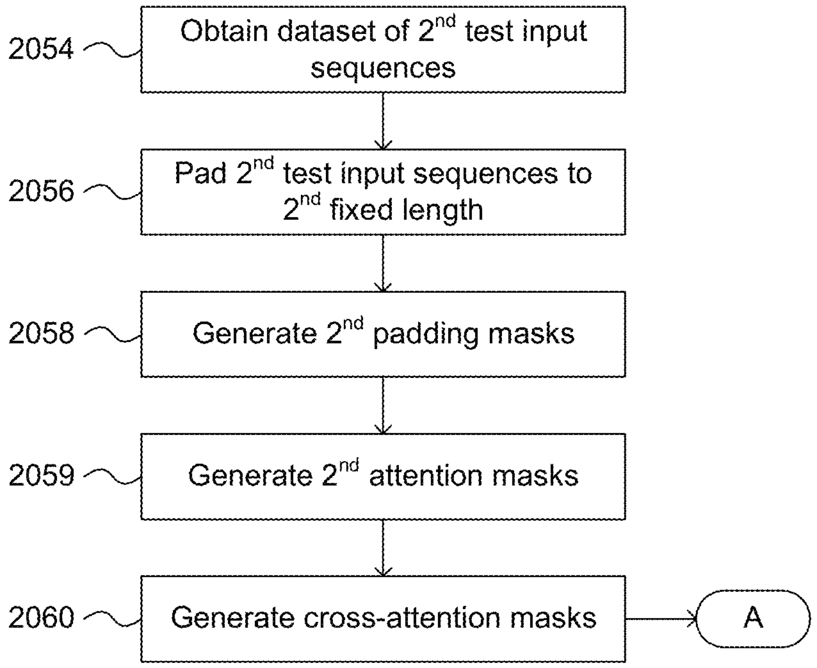
FIG. 20B continues the flowchart of FIG. 20A.

FIGS. 20A and 20B show a flowchart illustrating a method for selecting numerical formats suitable for use in a hardware implementation of an attention-based neural network (such as the one shown in FIGS. 1A and 1B). It would be desirable to choose numerical formats that are capable of a sufficiently accurate representation of the data, while avoiding excessive or redundant precision. If data is represented in excessively precise formats, this is liable to cause an increase in the computational complexity, power consumption, memory and bandwidth requirements, and/or on-chip area footprint. The chosen numerical formats may comprise or consist of fixed point formats. This can reduce or avoid the need to store data in floating point formats. The method of FIGS. 20A-20B may be performed, for example, by a data processing system as illustrated in FIG. 4, or by a general purpose data processing system, such as a server computer.

Referring to FIG. 20A, in step 2010, a representation is obtained of the attention-based neural network that is to be implemented in hardware. In step 2012, the data processing system implements the representation as a test neural network. In step 2014, the data processing system obtains a dataset of first test input sequences. According to one example, these may be input sequences for an encoder stack such as that of FIG. 1A. The dataset includes multiple first test input sequences of different lengths. In step 2016, the data processing system pads each of these test input sequences with padding values, to produce a respective first padded input sequence of a first fixed length. The first fixed length may be selected to be equal to the maximum length of any first test input sequence in the dataset. In step 2018, the data processing system generates a first padding mask for each first padded input sequence. Each first padding mask identifies the part of the respective first padded input sequence that contains padding values. In step 2019, the data processing system generates a first (self-) attention mask from the first padding mask. The generation of these masks corresponds to steps 513 and 514 in FIG. 6A.

Hardware for implementing an attention-based neural network such as accelerator 200, may support one type of number format for the network values. For example, hardware for implementing an RNN may support number formats wherein numbers are represented by a b-bit mantissa and an exponent exp. To allow different sets of network values to be represented using different number formats, hardware for implementing an RNN may use a type of number format that has one or more configurable parameters, wherein the parameters are shared between all values in a set of two or more values. These types of number formats may be referred to herein as block-configurable types of number formats or set-configurable types of number formats. Accordingly, non-configurable formats such as INT32 and floating point number formats are not block-configurable types of number formats.

In order to select numerical formats for an attention-based neural network, the attention based neural network is performed on test input sequences so as to provide statistics for the numerical format selection. Such statistics may be one or more of network values, mean/variance of values, minimum/maximum values, histograms summarising values, gradients calculated with respect to the output or a measure of error based on the output, and any other data used or generated by the neural network or logic monitoring the neural network which is required by the numerical format selection. In some examples, the attention based neural network is performed using a floating point number format for the values. For example, the attention based neural network may be performed in software using a floating point number format for the input data, weights, state and output data values in the network. 32-bit or 64-bit floating point number formats perform well because the number format should generally be as dose to lossless as possible for best results, but it can be possible to use a block-configurable number format with a large range/large number of bits.

The attention based neural network may be executed in any suitable manner in order to perform number format selection. For example, the attention based neural network may be performed in software (e.g. using a deep learning framework), or in hardware (e.g. at an accelerator such as accelerator).

In order to perform numerical format selection, the attention-based neural network is performed on suitable sample input data so as to enable appropriate statistics to be captured for use in the numerical format selection. The attention based neural network is executed for a predetermined number of one or more steps so as to generate the statistics at each time step which are required by the numerical format selection. Suitable test input sequences could comprise exemplary data selected to represent a typical or expected range of inputs to the attention based neural network to be implemented in hardware. In some examples, the test input sequences may be input sequences from the actual source to which the attention based neural network will be. It is well known in the art to capture statistics from neural networks and it will be appreciated that the particular nature of the statistics will depend on the nature of the neural network, its application and the requirements of the numerical format selection being used. The statistics (e.g. data values, maximums/minimums, histogram data) generated at the attention based neural network and/or logic associated with the attention based neural network may be captured in any suitable manner. In some examples, at least some of the statistics comprise intermediate data values generated at the attention based neural network.

Numerical format selection is applied to the statistics collected from the operation of the attention based neural network. The numerical format selection may run concurrently with the attention based neural network and/or may be subsequently performed on the captured statistics. The numerical format selection may be any algorithm for identifying block-configurable numerical format. The particular choice of algorithm is typically determined by one or more of: the application to which the attention based neural network is applied; and the amount of time and/or compute resources required to run the algorithm (more complex algorithms might give better results, but might take several times longer to run).

In the present examples in which the numerical format is selected from block-configurable types of number format, the number of bits of the exponent may be fixed (e.g. 6 bits signed). The exponent length need not therefore be stored with each data value and may instead be defined for groups of data values—for example, an exponent length may be predefined for each tensor, for sets of two or more elements of each tensor, for each type of tensor (e.g. different exponent lengths for inputs and/or weights and/or outputs), for groups of tensors, or for all of the tensors. The amount of data required to store the exponent and the length of the mantissa (e.g. the number of bits required to store the number format) may be fixed and negligible compared to the number of bits required to store the actual mantissas of the network values. The number of mantissa bits is therefore the primary determinant of the number of bits required to represent the number formats of the network values.

Numerical format selection algorithms may determine the length (e.g. in bits) of the mantissa of a block-configurable type of numerical format. For example, where each block-configurable number format used by an attention based neural network to represent data values comprises an exponent and a mantissa bit length, the mantissa bit length of the block-configurable number format used by the cell attributed the lowest portion of the quantisation error may be reduced, or the mantissa bit length of the block-configurable number format used by cell attributed the highest portion of the quantisation error may be increased. The quantisation error of a data value is the difference between the data value in an original floating point numerical format (i.e. as used in the implementation of the attention based neural network for number format selection purposes) and the data value in the block-configurable number format (i.e. as proposed for use in the hardware implementation of the attention based neural network).

Several methods have been developed for identifying number formats for representing network values of an attention based neural network. One simple method (which may be referred to herein as the full range method or the minimum/maximum or MinMax method) for selecting a number format for representing a set of parameters of an attention based neural network may comprise selecting, for a given mantissa bit depth n (or a given exponent exp), the smallest exponent exp (or smallest mantissa bit depth n) that covers the range for the expected set of network values x for a operation. For example, for a given mantissa bit depth b, the exponent exp can be chosen in accordance with the following equation such that the number format covers the entire range of x where $\lceil\cdot\rceil$ is the ceiling function:

$$exp = \lceil \log_2(\max(|x|)) \rceil - n + 1$$

However, such a method is sensitive to outliers. Specifically, where the set of network values x has outliers, precision is sacrificed to cover the outliers. This may result in large quantisation errors (e.g. the error between the set of network values in a first number format (e.g. floating point number format) and the set of network values in the selected number format). As a consequence, the error in the output data of the operation and/or of the attention based neural network caused by the quantisation, may be greater than if the number format covered a smaller range, but with more precision.

In other examples, a sum of squared errors algorithm with outlier weighting may be used. This algorithm can be appropriate where relatively important values are typically those at the higher end of the range of values of a given set of two or more values. This is particularly true for weight tensors that are regularised by penalising their magnitude and so we might expect elements with higher values to have greater relative importance than lower. Also, clamping is a particularly destructive form of noise that can introduce a strong bias in the resulting quantised set of two or more values. Therefore in some applications it can be advantageous to bias the error towards retaining large values, whilst avoiding the extreme of preserving the full range at the expense of quantisation error (e.g. as in the "MinMax" method). For example, a weighting function a(x) as shown in the following equation below combined with a squared measure of error could be used in a sum of squared errors algorithm:

$$\alpha(x) = \begin{cases} 1 + \frac{\gamma x}{SAT - \delta_e}, & \text{for } x > SAT - \delta_e \\ 1 + \frac{\gamma |x|}{SAT}, & \text{for } x < -SAT \\ 1, & \text{otherwise} \end{cases}$$

Where SAT is a saturation point defined as $2^{exp+n-1}$, exp is the exponent of the fixed number format, n is the number of bits of the mantissa, $\delta_e$ is $2^{exp}$ (i.e. one quantisation level), and $\gamma$ is the gradient which is chosen empirically. A gradient of 20 can work well for some neural networks.

A weighted outlier method is described in the Applicant's GB Patent Application No. 1718293.2, which is herein incorporated by reference in its entirety. In the weighted outlier method the number format for a set of values is selected from a plurality of potential number formats based on the weighted sum of the quantisation errors when a particular number format is used, wherein a constant weight is applied to the quantisation errors for network values that fall within the representable range of the number format and a linearly increasing weight is applied to the quantisation errors for the values that falls outside the representable range.

Yet another method (which may be referred to as the back-propagation method) is described in the Applicant's GB Patent Application No. 1821150.8, which is herein incorporated by reference in its entirety. In the back-propagation method the quantisation parameters that produce the best cost (e.g. a combination of attention based neural network accuracy and attention based neural network size (e.g. number of bits)) are selected by iteratively determining the gradient of the cost with respect to each quantisation parameter using back-propagation, and adjusting the quantisation parameters until the cost converges. This method can produce good results (e.g. an attention based neural network that is small in size (in terms of number of bits), but is accurate), however it can take a long time to converge.

In general, the selection of number formats may be conceived of as an optimisation problem which could be performed on one, some or all of the parameters of the number formats in the attention based neural network. In some examples, a plurality of parameters of the number formats may be optimised simultaneously; in other examples, one or more parameters of the format selection method may be optimised in turn. In some examples, the bit depths of the network values may be predefined with the format selection algorithm being applied so as to select suitable exponents for the network values of the attention based neural network. The bit depths for the network values may be fixed or in some examples may be a parameter to be optimised. In some examples, applying the numerical format selection may comprise identifying appropriate bit depths of the attention based neural network. In order to ensure that each iteration of the test neural network is identical, instances of two or more values in different iterations of the attention based neural network are constrained to have the same bit depth.

Referring to FIG. 20B, in step 2054, a dataset of second test input sequences is obtained by the data processing system. Staying with the example of FIGS. 1A and 1B, the second test input sequences may be test input sequences for the decoder stack of FIG. 1B. Again, the dataset includes multiple second test input sequences of different lengths. A second fixed length is determined, which is equal to the maximum sequence-length over all of the second test input sequences. In step 2056, the data processing system pads each of the second test input sequences to the second fixed length, producing respective second padded input sequences. In step 2058, the data processing system generates a respective second padding mask for each second padded input sequence. Next, in step 2059 the data processing system generates a respective second (self-)attention mask for each second padded input sequence. These steps correspond to steps 523 and 524 in FIG. 6A. The data processing system also generates a cross-attention mask corresponding to each pair of first and second padded input sequences (step 2060). This step corresponds to step 525 in FIG. 6A.

Referring again to FIG. 20A, in step 2020, the data processing system processes the first and second padded input sequences, the first and second (self-) attention masks, and the cross-attention masks through the test neural network. While performing this processing, the data processing system collects statistics on the values obtained during the processing (see step 2022). The statistics describe the ranges of values encountered at each of the layers of the neural network, when processing the test sequences through the test neural network. The statistics capture relevant information about suitable numerical formats that can be used to represent (and store) the data at the various layers, when the neural network is ultimately implemented in hardware. In step 2024, the data processing system selects numerical formats according to the collected statistics.

If operations will be implemented in hardware as a plurality of elementary neural network operations (as explained above for batch matrix multiplications and Softmax, for example), then the data processing system may collect statistics and select numerical formats for each of the elementary neural network operations.

If the neural network includes a decoder stack that will be executed in multiple iterations, then the data processing system may collect statistics over all of the iterations, for all of the (first and second) test sequences. Numerical formats can then be chosen for each layer in the decoder stack such that the same numerical format is used in every iteration for any given layer. This helps to avoid the need to reconfigure the hardware implementation between iterations of the decoder stack, which may be complicated or time-consuming in the inference phase.

The data processing system may select numerical formats for the first and second (self-)attention masks, and the cross-attention mask. Additionally, it may select a value (or values) for the "large negative values" in these attention masks.

In some cases, the large negative values may be chosen to be equal to the largest negative value representable by the numerical format selected for the associated attention mask. In some embodiments, this might not be the case; however, the selected large negative values may nevertheless have values that are more negative than the largest negative value, observed over the course of processing the test sequences, in a data tensor input to a layer in which the respective attention mask is used. The selected large negative values may be more negative than this governing value by a margin. That is, there may be several (unused) values between the largest negative value present in the data tensor and said large negative values. In some examples, the large negative values may be selected such that they have an absolute value that is greater than the largest absolute value of the data tensor. They may be greater by a margin—that is, there may be several (unused) values between the largest absolute value of the data tensor and the absolute value of the large negative values. In some cases, the large negative values, x, may be chosen such that e^x=0, in the numerical format selected for the relevant attention mask.

Training

Figure 21:
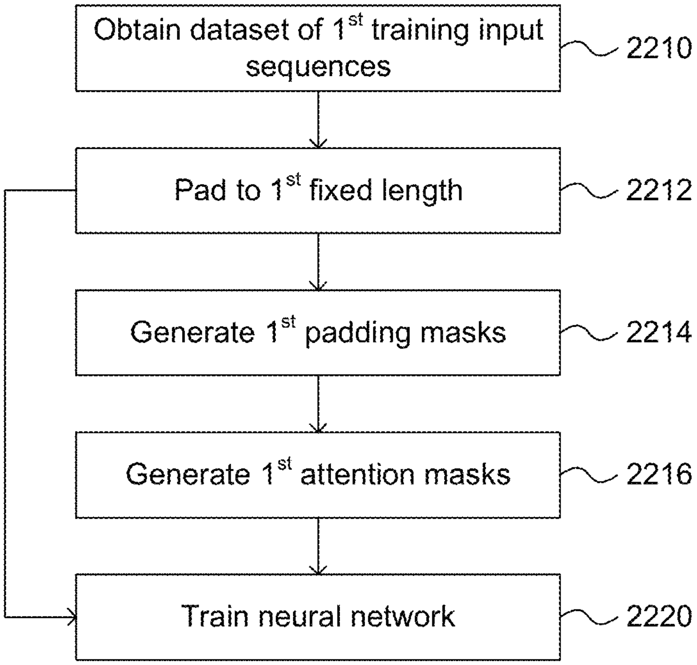
FIG. 21 is a flowchart illustrating a method of training an attention-based neural network according to an example.

A method of training an attention-based neural network suitable for hardware implementation will now be described, with reference to FIG. 21. This method may be performed by a data processing system such as the one shown in FIG. 4 or by a general data processing system, such as a server computer.

In step 2210, a dataset of first training input sequences is obtained. For simplicity, in this example, it will be assumed that the attention-based neural network comprises only a decoder stack and no encoder stack. Therefore, the first training input sequences are input sequences for the decoder. It should be understood, however, that the neural network may include an encoder stack, in other examples. In such examples, a dataset of second training input sequences may be provided for the encoder.

In step 2212, each of the first training input sequences is padded with padding values, to produce a respective first padded input sequence of a first fixed length. The first fixed length has already been selected in advance—for example, in the course of selecting numerical formats for the layers of the neural network in a method such as that illustrated by FIGS. 20A-20B. The first fixed length is greater than or equal to the maximum length among all of the training input sequences. It should be noted that the dataset of training input sequences (obtained in step 2210) might be identical to the dataset of test input sequences (obtained in step 2014), but this is not essential. In general, these may be different datasets.

In step 2214, a first padding mask is generated for each training input sequence. The padding mask indicates the part of the respective padded input sequence that contains the padding values. As with the other padding masks discussed above, the padding mask may contain values of one in locations corresponding to the elements of the original training input sequence (prior to padding). The padding mask may contain zeros in locations corresponding to the padding values.

In step 2216, a (self-)attention mask is defined for each of the training input sequences. The attention mask prevents the attention-based neural network from attending to certain parts of the padded input sequence, during training of the neural network. In particular, the attention mask prevents the network from attending to the padded part of each training input sequence. In some examples, the attention mask may also be configured to prevent the network from attending to certain elements of the original training input sequence. The attention mask may contain large negative values at locations corresponding to elements to which the network should be prevented from attending, and zeros at other locations. The attention mask is generated from the respective padding mask in the same manner as described already above. As also discussed above, the attention mask may be modified based on external inputs, to prevent network from attending to specified elements of the training input sequences.

In step 2220, the attention-based neural network is trained using the padded input sequences generated in step 2212, and the (self-)attention masks generated in step 2216. The attention masks are used to ignore certain elements of the respective training input sequences. (This prevents the network from attending to the ignored elements.) Since the attention-based neural network comprises only a decoder stack, in the present example, there are no cross-attention masks needed. In other examples, in which the network comprises both encoder and decoder stacks, a cross-attention mask would be generated for each pair of training input sequences (to the encoder and decoder, respectively) from the padding masks associated with the respective training input sequences.

In some examples, the decoder stack is to be executed in multiple iterations. At each iteration (other than the first iteration), the output of the decoder stack from the previous iteration is used as the input to the decoder stack for the next iteration. In such examples, the self-attention mask associated with each training input sequence may be updated at each iteration to allow the decoder stack to attend to more of the (padded) training input sequence than in the previous iteration.

In the foregoing examples, the mapping unit 12 and the MMM 40 were described as separate components to the hardware accelerator 200. This is not to be understood as limiting. In some examples, the mapping unit 12 (or at least a part of it) and the MMM 40 may be integrated as part of the hardware accelerator 200.

The methods and data processing systems described herein are useful for processing input data of a wide variety of types, in a wide variety of applications. Of particular interest are image processing applications, where an input to the neural network comprises image or video data. The neural network may be configured to process the image or video data and produce further image or video data—for example, image or video data that has had its resolution enhanced, artefacts removed, or visual content otherwise modified in some way. Alternatively, the neural network may be configured to analyse the visual content of the image or video—for example, to detect faces, segment and/or classify objects, etc. Also of particular interest are audio processing applications, including tasks such as denoising, speaker detection/identification. Also of particular interest (and overlapping with audio processing applications in some cases) are NLP applications. These include but are not limited to speech recognition; text-to-speech; and machine translation. In some examples, the neural network may be configured to process multimodal data—that is, data of two or more different types/media. An example would be the use of both image data and text (caption) data for a classification or verification task.

Image and video data may be input to an attention-based neural network in a variety of ways. A video can be input as a sequence of frames, whereby each frame constitutes one element of the sequence, and the length of the sequence (over which attention is calculated) is equal to the number of frames. Image data can also be presented as a sequence of elements. For example, each pixel may be regarded as one element. The length of the sequence is then equal to the number of pixels. Such approaches can allow videos with different numbers of frames, or images with different numbers of pixels, to be processed by the attention-based neural network without the need to resize or resample the data as a pre-processing step.

Figure 22:
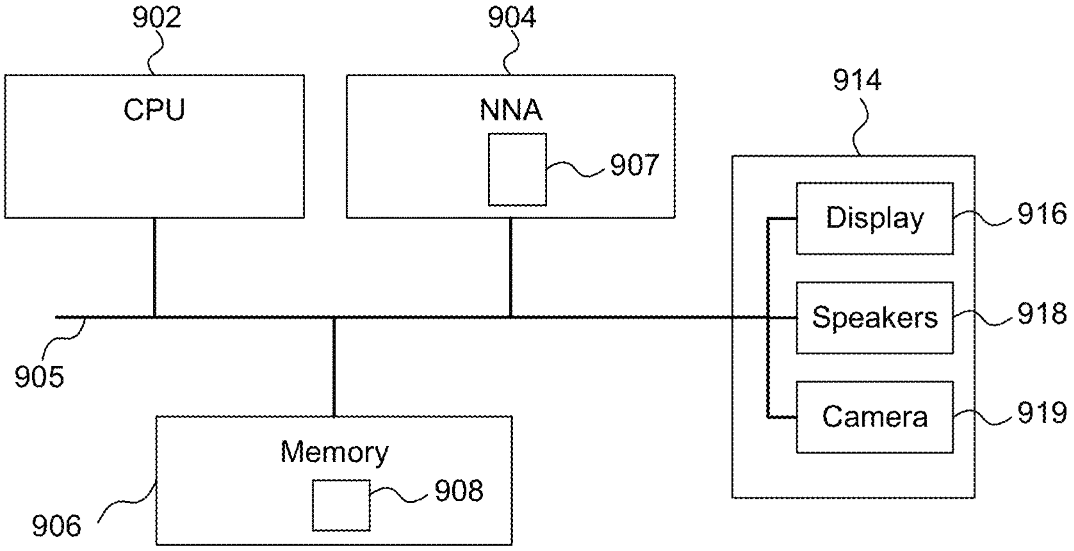
FIG. 22 shows a computer system in which a data processing system is implemented.

FIG. 22 shows a computer system in which the data processing systems described herein may be implemented. The computer system comprises a CPU 902, an NNA 904, a memory 906 and other devices 914, such as a display 916, speakers 918 and a camera 919. A processing block 907 (corresponding to mapping unit 12, MMM 40, and hardware accelerator 200) is implemented on the NNA 904. The components of the computer system can communicate with each other via a communications bus 905. A store 908 (corresponding to memory 25) is implemented as part of the memory 906.

The data processing system of FIG. 4 is shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing systems described herein may be embodied in hardware on an integrated circuit. The data processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a data processing system configured to perform any of the methods described herein, or to manufacture a data processing system comprising any apparatus described herein. An integrated circuit definition dataset may be, for example, an integrated circuit description.

Therefore, there may be provided a method of manufacturing, at an integrated circuit manufacturing system, a data processing system as described herein. Furthermore, there may be provided an integrated circuit definition dataset that, when processed in an integrated circuit manufacturing system, causes the method of manufacturing a data processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system will now be described with respect to FIG. 23.

Figure 23:
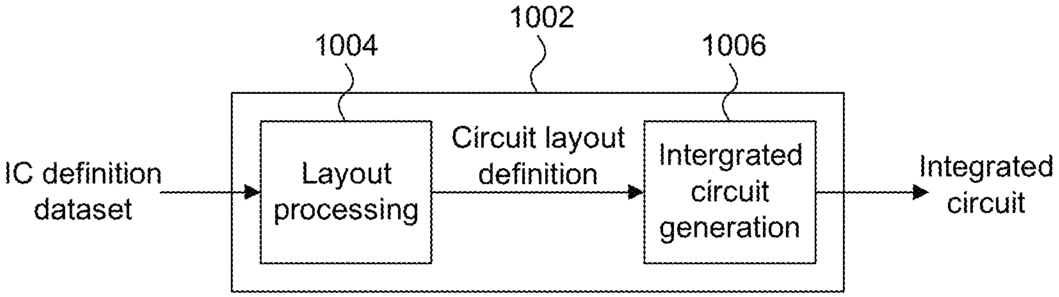
FIG. 23 shows an integrated circuit manufacturing system for generating an integrated circuit embodying a data processing system.

FIG. 23 shows an example of an integrated circuit (IC) manufacturing system 1002 which is configured to manufacture a data processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 1002 to manufacture an integrated circuit embodying a data processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 23 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 23, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method for selecting numerical formats for use in configuring a hardware implementation of an attention-based neural network, the method comprising:

obtaining a representation of the attention-based neural network;

implementing the representation as a test neural network;

obtaining a dataset of first test input sequences for the attention-based neural network, wherein the dataset includes first test input sequences of varying length;

padding each first test input sequence with padding values to produce a respective first padded input sequence of a first fixed length;

generating, for each first padded input sequence, a respective first padding mask identifying a part of the first padded input sequence that contains the padding values;

generating a first attention mask from each first padding mask, wherein the generating comprises an outer product operation applied to the first padding mask;

processing the first padded input sequences and generated first attention masks through the test neural network;

collecting statistics describing ranges of values obtained during said processing, wherein the statistics describe ranges of values for at least two different layers of the attention-based neural network; and selecting numerical formats for the at least two different layers based on the collected statistics.

2. The method of claim 1, wherein the attention-based neural network comprises a decoder, wherein the first test input sequences are test input sequences for the decoder, wherein processing each of the first padded input sequences and respective first attention masks through the test neural network comprises executing the decoder for a number of iterations equal to the first fixed length, wherein the statistics are collected over all of the iterations.

3. The method of claim 2, wherein, at each iteration the decoder produces an output sequence, and, at each iteration other than an initial iteration, the input to the decoder comprises the output sequence from the preceding iteration.

4. The method of claim 1, wherein the attention based neural network comprises an encoder, and wherein the first test input sequences are test input sequences for the encoder.

5. The method of claim 4, wherein the attention-based neural network further comprises a decoder, the method further comprising:

obtaining a dataset of second test input sequences, wherein the second test input sequences are test input sequences for the decoder;

padding each second test input sequence with padding values to produce a respective second padded input sequence of a second fixed length;

generating, for each second padded input sequence, a respective second padding mask identifying the part of the second padded input sequence that contains the padding values; and generating a second attention mask from each second padding mask, wherein the generating comprises an outer product operation applied to the second padding mask, wherein the method further comprises selecting a numerical format for at least one layer of the decoder.

6. The method of claim 5, further comprising executing the decoder for a number of iterations equal to the second fixed length, wherein, at each iteration the decoder produces an output sequence, and, at each iteration other than an initial iteration, the input to the decoder comprises the output sequence from the preceding iteration, wherein the statistics are collected over all of the iterations.

7. The method of claim 5, further comprising generating a cross-attention mask from each first padding mask and respective second padding mask, comprising an outer product of the first padding mask with the second padding mask, wherein the method further comprises:

processing the first padded input sequences, the second padded input sequences, the first attention masks, the second attention masks, and the cross-attention masks through the test neural network, and selecting numerical formats for any one or any combination of two or more of: the first padded input sequences, the second padded input sequences, the first attention masks, the second attention masks, and the cross-attention masks.

8. The method of claim 1, wherein the attention-based neural network comprises a scaled dot-product attention calculation.

9. The method of claim 1, wherein each first attention mask comprises:

a plurality of zeros, in locations corresponding to the elements of the respective first input sequence; and one or more large negative values, in locations corresponding to the padding values of the respective first padded input sequence.

10. The method of claim 1, wherein the attention-based neural network comprises a Softmax function, and wherein the processing comprises adding the first attention mask to an input to the Softmax function.

11. The method of claim 1, wherein the attention-based neural network comprises a transformer network.

12. The method of claim 1, wherein the attention-based neural network comprises a layer normalisation.

13. The method of claim 12, wherein the hardware implementation is configured to perform a set of available elementary neural network operations, the method further comprising:

mapping the layer normalisation to an equivalent representation comprising a plurality of elementary neural network operations from the set of available elementary neural network operations; and selecting numerical formats for said plurality of elementary neural network operations, wherein each of the plurality of elementary neural network operations is selected from the list consisting of:

a convolution operation;

an element-wise subtraction operation;

an element-wise multiplication operation;

a reciprocal operation;

a square root operation;

an element-wise division operation;

a rectified linear activation function;

a local response normalisation; and an element-wise addition.

14. The method of claim 13, wherein the plurality of elementary neural network operations implements:

a first convolution operation, applied to an input to the layer normalisation, to calculate a mean of the input;

an element-wise subtraction operation, to subtract the mean from the input;

a first element-wise multiplication operation, to calculate the square of the output of the element-wise subtraction operation; and a second convolution operation, applied to the output of the first element-wise multiplication operation, to calculate the variance about the mean.

15. The method of claim 14, wherein the plurality of elementary neural network operations implements:

a square root operation and a reciprocal operation, applied after the second convolution operation, to calculate the reciprocal of the standard deviation; and a second element-wise multiplication operation, to multiply the output of the element-wise subtraction operation by the reciprocal of the standard deviation.

16. The method of claim 14, wherein the plurality of elementary neural network operations implements:

a square root operation, applied to the output of the second convolution operation, to calculate the standard deviation; and an element-wise division operation, to divide the output of the element-wise subtraction operation by the standard deviation.

17. The method of claim 1, wherein the attention-based neural network comprises a matrix multiplication operation defined in two or more dimensions between a first tensor X having dimensions [ . . . , P, . . . , Q, . . . ] and a second tensor Y having dimensions [ . . . , Q, . . . , R, . . . ], the method comprising:

mapping the matrix multiplication operation to a graph of neural network operations including at least one transformation and at least one convolution operation; and selecting numerical formats for the graph of neural network operations.

18. The method of claim 1, wherein the attention-based neural network comprises a matrix multiplication operation defined in two or more dimensions between a first tensor X having dimensions [ . . . , P, . . . , Q, . . . ] and a second tensor Y having dimensions [ . . . , Q, . . . , R, . . . ], the method comprising:

mapping the matrix multiplication operation to a graph of neural network operations including at least one element-wise operation; and selecting numerical formats for the graph of neural network operations.

19. A graphics processing system configured to perform the method as set forth in claim 1.

20. A non-transitory computer readable storage medium having stored thereon computer executable code configured to cause the method as set forth in claim 1 to be performed when the code is run on at least one processor.

* * * * *